United States Patent [19]

Kanno et al.

[11] Patent Number: 5,346,382
[45] Date of Patent: Sep. 13, 1994

[54] HOT RUNNER EXCHANGE APPARATUS FOR USE IN AN INJECTION MOLDING MACHINE

[75] Inventors: Hiroshi Kanno, Numazu; Tsugio Toyama, Sunto; Koichi Kanazawa; Koichi Ozawa, both of Susono, all of Japan

[73] Assignee: Toshiba Kikai Kabushiki Kaisha, Tokyo, Japan

[21] Appl. No.: 912,755

[22] Filed: Jul. 13, 1992

[30] Foreign Application Priority Data

| Jul. 12, 1991 | [JP] | Japan | 3-054174[U] |
| Sep. 2, 1991 | [JP] | Japan | 3-221366 |
| Sep. 5, 1991 | [JP] | Japan | 3-225589 |
| Sep. 10, 1991 | [JP] | Japan | 3-230433 |

[51] Int. Cl.⁵ ............................... B29C 45/56
[52] U.S. Cl. ..................... 425/190; 425/192 R
[58] Field of Search ............ 425/190, 185, 182, 186, 425/188, 192 R

[56] References Cited

U.S. PATENT DOCUMENTS 4,706,926  11/1987  Von Holdt ............... 425/192 R

Primary Examiner—Tim Heitbrink
Attorney, Agent, or Firm—Cushman, Darby & Cushman

[57] ABSTRACT

In a hot runner exchange apparatus for use in a vertical type injection molding machine made up of a metal mode, a mold clamping device for opening and closing the metal mold in the vertical direction, an injection device having a nozzle provided at the front end of a heating cylinder and a hot runner acting as a passage of molten resin supplied to the metal mold, there are provided a hanger for hanging the hot runner, a device for vertically moving the hung hot runner and a driving device for moving the hung hot runner in the axial direction thereof.

11 Claims, 29 Drawing Sheets

5,346,382

1

HOT RUNNER EXCHANGE APPARATUS FOR USE IN AN INJECTION MOLDING MACHINE

BACKGROUND OF THE INVENTION

This invention relates to apparatus for readily exchanging a hot runner utilized in a vertical type injection molding machine.

One example of a prior art hot runner utilized in a vertical type injection molding machine is disclosed in Japanese Patent Publication No. 10287/1986 and No. 49621/1990. Inventions described in these Patent Publications relate to absorption of thermal expansion, correction of nozzle position, leakage of resin, prevention of dangerous state resulting from generation of thermal stress and prevention of leakage of the resin from an opening and closing valve at the nozzle portion on the side of the hot runner. These inventions relate to a vertical type injection molding machine which manufactures only certain types of products.

In recent years, user needs have become varied. In the field of large size molded plastic products higher production efficiency has been demanded so it has been necessary to satisfy demand by producing a small number of products of various kinds. As a consequence, in a vertical type injection molding machine utilizing a hot runner it is necessary to quickly change colors and resins. However, in conventional machines, it was not necessary to instantly remove an old resin remaining in the hot runner. Further, due to the construction of the hot runner it is extremely difficult to instantly remove the old resin remaining in the hot runner. Furthermore, the construction of mounting and assembling the hot runner becomes complicated, with the result that according to the prior art, the hot runner was not contemplated to be frequently removed.

SUMMARY OF THE INVENTION

Accordingly, it is an object of this invention to provide an improved hot runner exchange apparatus capable of rapidly change color and resin in a short time, thus greatly reducing time loss and improving productivity.

According to this invention there is provided hot runner exchange apparatus utilized in a vertical type injection molding machine comprising a metal mold opened and closed in a vertical direction, a mold clamping device, an injection device having a heating cylinder, a nozzle at the front end of the heating cylinder, the nozzle being directed in a horizontal direction, and a hot runner acting as a passage for supplying molten resin to the mold clamping device from the injection device, wherein the hot runner exchange apparatus comprises means for hanging the hot runner means for moving the hung hot runner in a vertical direction, and means for moving the hung hot runner in an axial direction thereof.

DESCRIPTION OF THE PREFERRED EMBODIMENTS

The first embodiment of this invention will firstly be described with reference to FIGS. 1 to 4.

Figure 1:
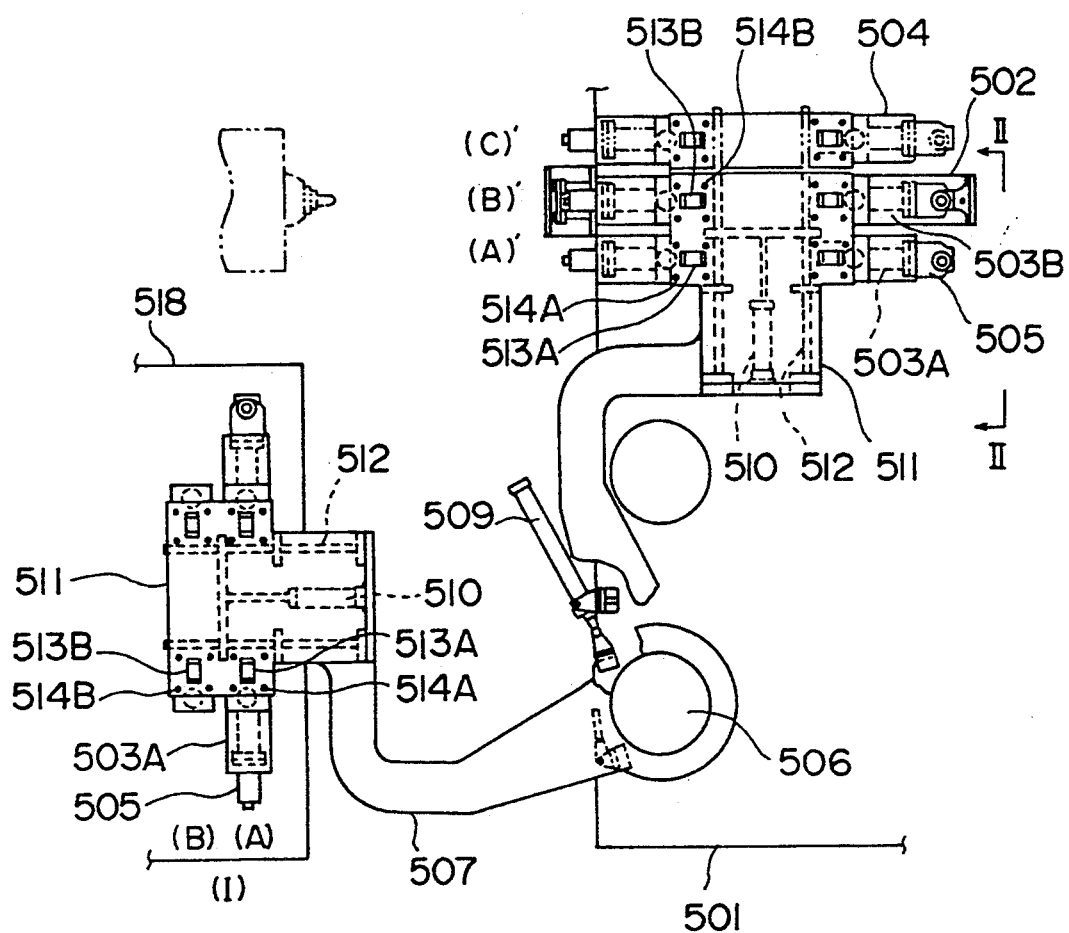
FIG. 1 is a plan view showing a hot runner exchange apparatus according to the first embodiment of this invention in which both of exchange apparatus in a waiting state and an exchange apparatus in an injection molding machine are shown.
Figure 2:
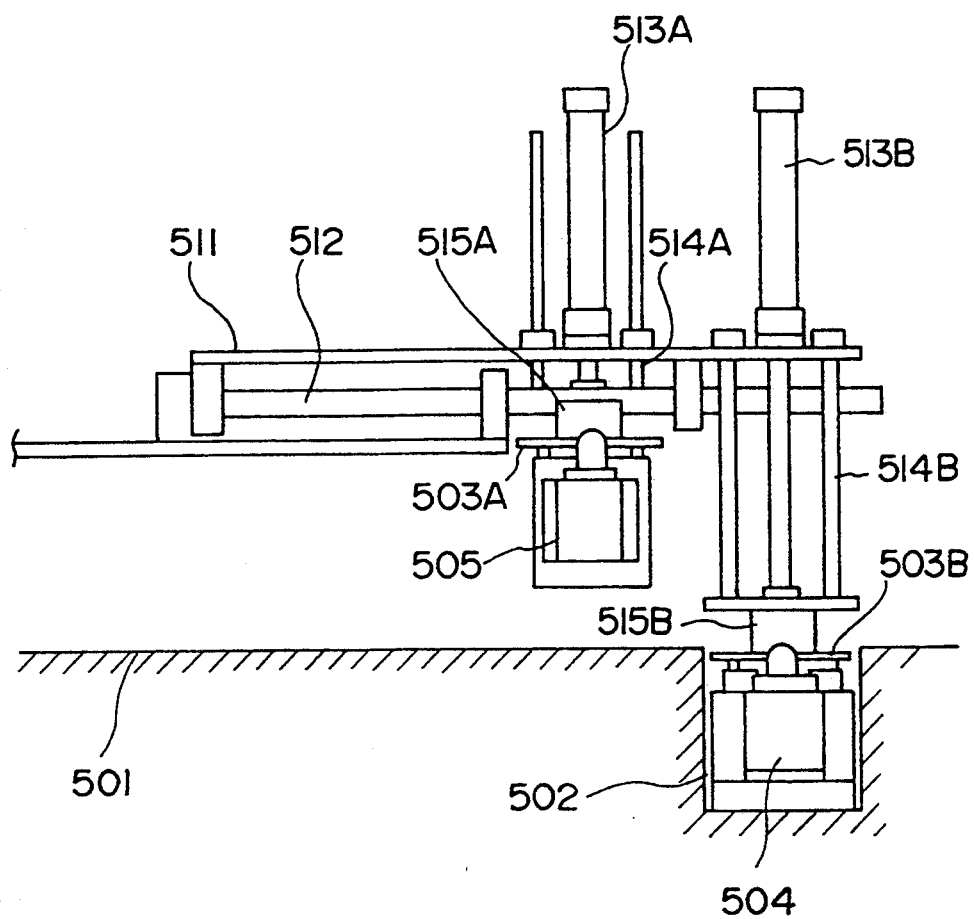
FIG. 2 is a side view as viewed from a line II—II shown in FIG. 1.
Figure 3:
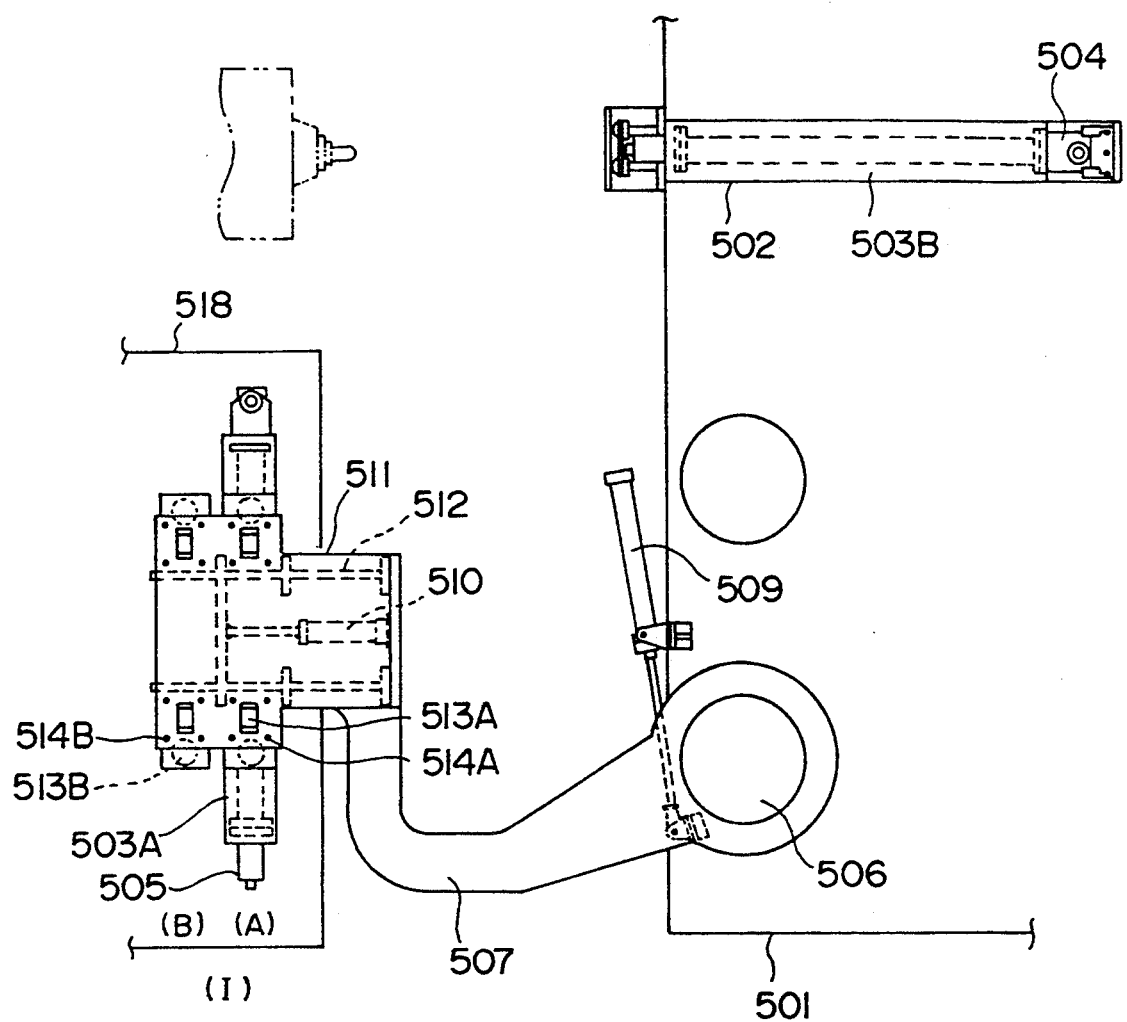
FIG. 3 is a plan view showing the exchange apparatus in a waiting state.
Figure 4:
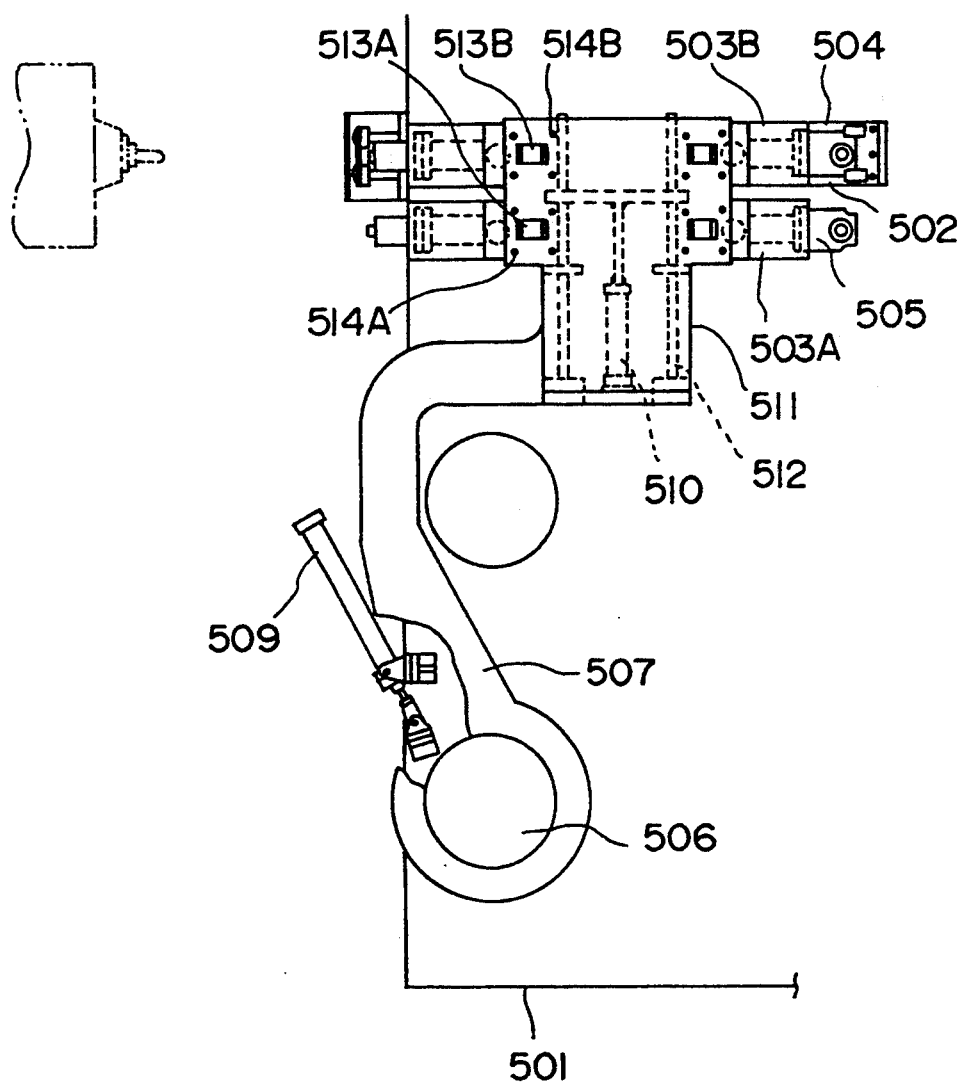
FIG. 4 is a plan view showing the exchange apparatus in the injection molding machine.

FIG. 1 shows a hot runner exchange apparatus in a state wherein the exchange apparatus has picked up a hot runner to be used next and is in a waiting state on a hot runner table, and the state of new and old hot runners to be exchanged in the injection molding machine. FIG. 2 is a side view as viewed from the line II—II shown in FIG. 1. FIG. 3 is a plane view showing the exchange apparatus in a waiting state in which the hot runner to be used next has been picked on a hot runner table, and FIG. 4 is a plane view of the exchange apparatus showing a state prior to the exchange in the injection molding machine. A reference numeral 501 shows a stationary die plate for mounting a stationary metal mold. A hot runner groove 502 is formed in the die plate 501, and a first hot runner 504 is located in the hot runner groove 502. A cover 503A is mounted on the upper portion of a second hot runner 505 covering the upper portion of groove 502 at a substantially same level as the surface of the first hot runner 504. On a guide rod 506 acting as a guide bar of a vertical mold clamping device, a swinging arm 507 is rotatably mounted. The swinging of the swinging arm 507 is effected by a swinging arm operating cylinder 509 held by the stationary die plate 501 like a trunnion and by rotatably connecting the fore end of the rod of cylinder 509 to the swinging arm.

A sliding cylinder 510 is mounted on the swinging arm 507. Further, a plate 511 reciprocated by cylinder 510 and guide bar 512 for guiding the plate 511 are provided. A plurality of vertically operating cylinders, that are cylinders 513A for operating the second hot runner 505 and cylinder 513B for operating the first hot runner 504 are supported by plate 511. A plurality of guide bars (guide bars 514A for the second hot runner 505 and the guide bars 514B for the first hot runner 504) for guiding the vertical movement of the piston rods of respective cylinders 513A and 513B are provided on the plate 511. Electromagnets 515A and 515B are attached to the lower ends of the piston rods of cylinders 513A and 513B.

By using the hot runner exchange apparatus having a construction described above, the operation of exchanging an already used first hot runner 504 with a second hot runner 505 to be used next will be described as follows.

At a position I on the outside of the injection molding machine shown in FIGS. 1 and 3, cylinders 513A which operate in the vertical direction at a position A are lowered for causing electromagnets 515A secured to the lower ends of the piston rods of the cylinders 513A to engage and pick up cover 503A mounted on the upper portion of the second hot runner 505 to be used next, the second hot runner has been set on the hot runner table 518. Then the piston rods of cylinder 513A are retracted for maintaining the raised second hot runner 505 in a waiting position.

The cylinders 513B operating in the vertical direction at a position B withdraw their piston rods for maintaining the raised electromagnets 515B in waiting positions. At this time, the hot runner table 518, the second hot runner 505 and the swinging arm 507 are maintained in definite relative positions.

The used first hot runner 504 is inserted in the groove 502 formed in the stationary die plate 501, and on the upper portion of the first hot runner 504 is secured a cover 503B similar to the second hot runner 505. The end of the hot runner on the side confronting the nozzle of the injection molding machine is held by a positioning device for holding the hot runner at a predetermined position and the positioning device is released by a release instruction, the end portion of the hot runner becomes free.

FIG. 4 shows a state after the piston rod of the swinging arm moving cylinder 509 has been withdrawn and after the swinging arm 507 has been swung about the guide rod 506 to a predetermined position. In this state, the end portion on the side of the injection machine side of the first hot runner 504 is released from the holding and positioning device, the electromagnets 515B secured to the lower ends of piston rods of cylinder 513B operating in the vertical direction are lowered to engage and pick up the cover 503B of the first hot runner 504. Thereafter, the piston rods are withdrawn to raise the first hot runner 504 and hold it at the raised position.

Then the sliding cylinder 510 is activated to advance its piston rod for moving the second hot runner 505 conveyed from the hot runner table 518 to position B' from position A' shown in FIG. 1. As a consequence the first hot runner 504 moves from position B' to position C'. After the hot runners 504 have been moved to position C, the piston rods of the cylinder 513A moved in the vertical direction are lowered for inserting the second hot runner 505 in the groove 502 formed in the stationary die plate 501 and the electromagnets 515A are deenergized by operating the holding and positioning device the positioning and holding of the end portion on the side of the injection device of the hot runner 505 are achieved and the hot runner 505 is set on the predetermined position.

Then the piston rod of cylinder 513A are withdrawn for raising the electromagnet 515A on the front end of the piston rod and the piston rod of the sliding cylinder 510 is withdrawn to the original position and the piston rod of the swinging arm moving cylinder 509 is advanced for rotating the swinging arm 507 about guide rod 506 to return the swinging arm to the position shown in FIG. 3. At this time, the first hot runner 504 removed from the injection molding machine is located as a position B shown in FIG. 3. Then, the vertically movable piston rod of the cylinder 513B is lowered for mounting the first hot runner 504 on the hot runner table 518 and then the electromagnet 515B is deenergized for withdrawing the piston rod of cylinder 513B to a waiting state.

Although in the embodiment described above the hot runner to be used next is mounted on the hot runner table 518 and then exchanged, where two hot runners are alternately exchanged it is sufficient to pick up and hold the waiting hot runner at the waiting position outside of the injection molding machine. Further, the embodiment described above was constructed such that by providing two take out devices for the swinging arm 507 hot runners were exchanged by a single exchanging operation, even when a single take out device is provided for the swinging arm, by performing the taking out operation of the first hot runner 504 to the outside of the injection molding machine and the mounting operation for inserting the second hot runner 505 into the injection molding are made only once, the exchange of the hot runners is possible.

In the above described embodiment, the swinging of the swinging arm 507 is made by the piston cylinder assembly, but it is possible to make the same operation by other means such as a swinging motor.

As means for moving in the vertical direction, it can be used an electric motor for driving a ball screw.

The second embodiment of this invention will be described with reference to FIGS. 5 through 11.

In FIGS. 5 through 11, a reference numeral 701 shows a stationary die plate. A hot runner groove 702 is formed in the stationary die plate 701. 703 shows the tie bar of a clamping device, and 704 shows a hot runner which is inserted in the groove 702 at the time of injection molding. A support 705 is provided on the outside of the injection molding machine, and the support 705 being provided with a cylinder 706 for moving the hot runner into and out of the injection molding machine. The support 705 is provided with a guide block 707 through which guide bars 708 extend.

A nozzle 709 of the hot runner is moved toward and away from a metal mold by a suitable mechanism, such as supporting cylinder 710 for positioning and holding a nozzle, not shown, formed at the front end of a heating cylinder or barrel of the injection molding machine. By the reciprocating motion of the supporting cylinder 710, positioning, holding and release of the nozzle of the hot runner are possible.

Figure 10:
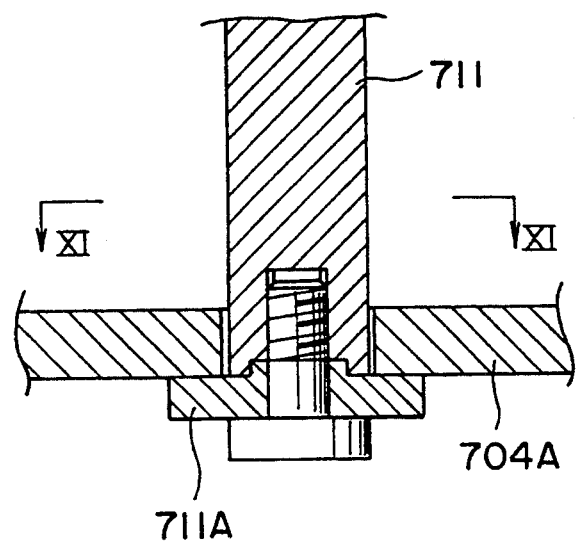
FIG. 10 is a side view showing a hanging member hanging the hot runner.
Figure 11:
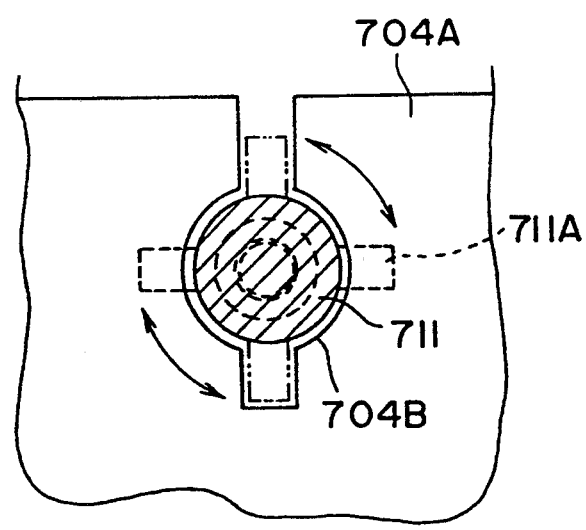
FIG. 11 is a sectional view of the hanging member taken along a line XI—XI in FIG. 10.
Figure 12:
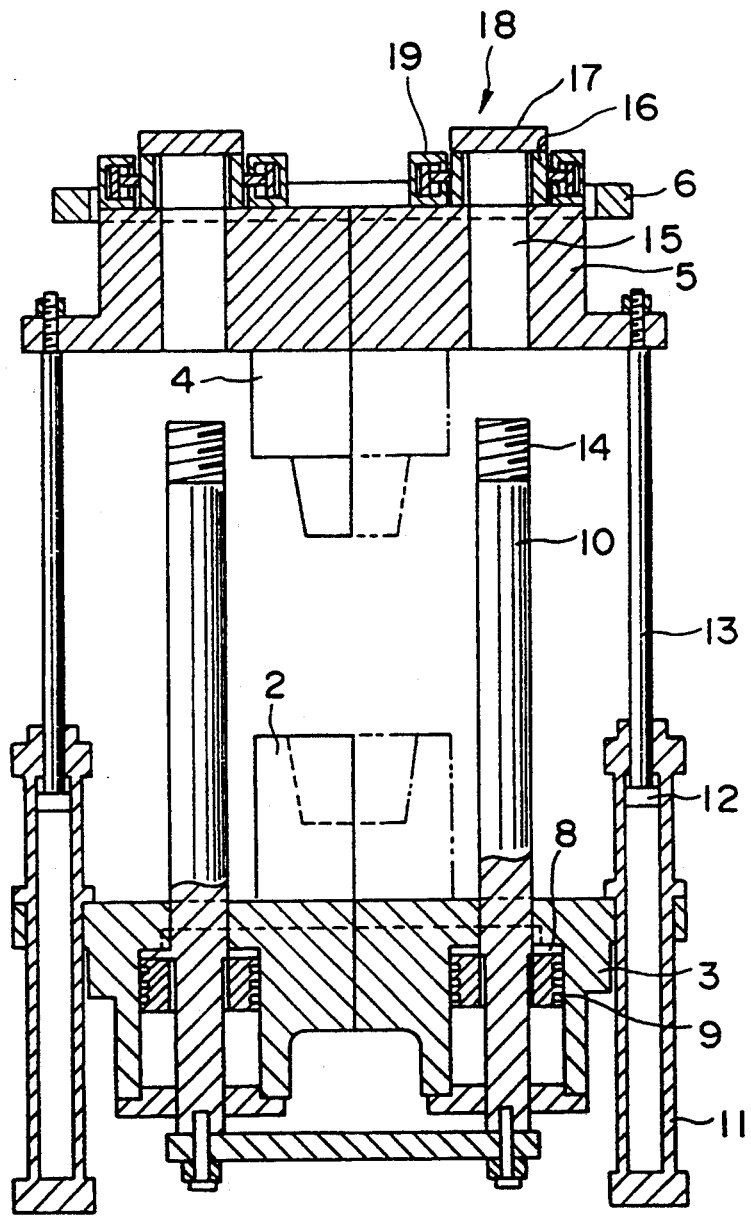
FIG. 12 shows a vertical sectional view taken along a line XII—XII in FIG. 15 showing a movable die plate in an elevated position.
Figure 13:
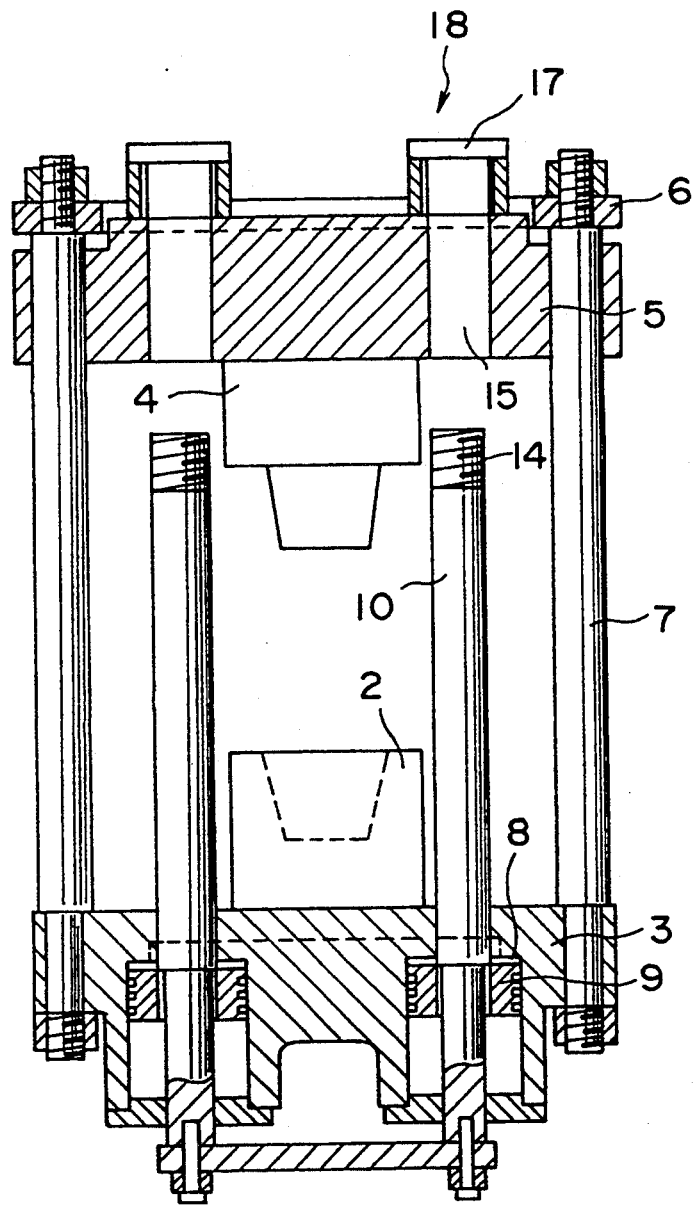
FIG. 13 shows a vertical sectional view taken along a line XIII—XIII in FIG. 15 showing the movable die plate in an elevated position.
Figure 14:
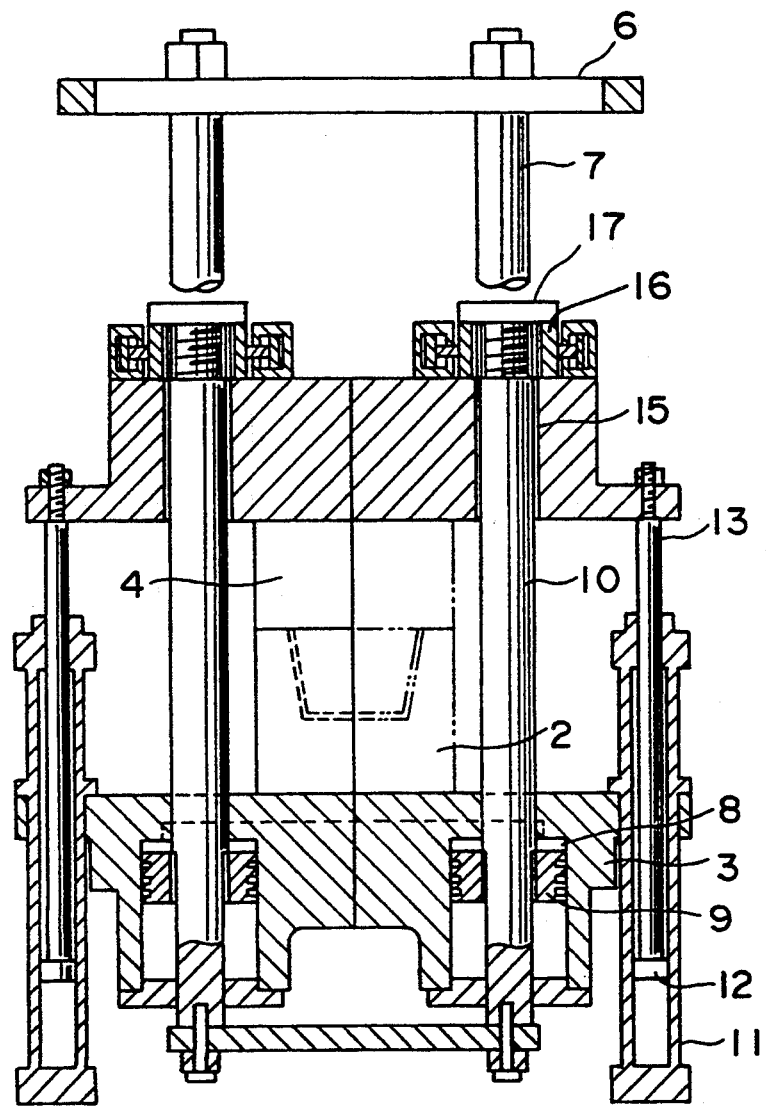
FIG. 14 is a vertical sectional view of the movable die plate taken along a line XII—XII in FIG. 15 when the movable die plate is in a lowered position.
Figure 15:
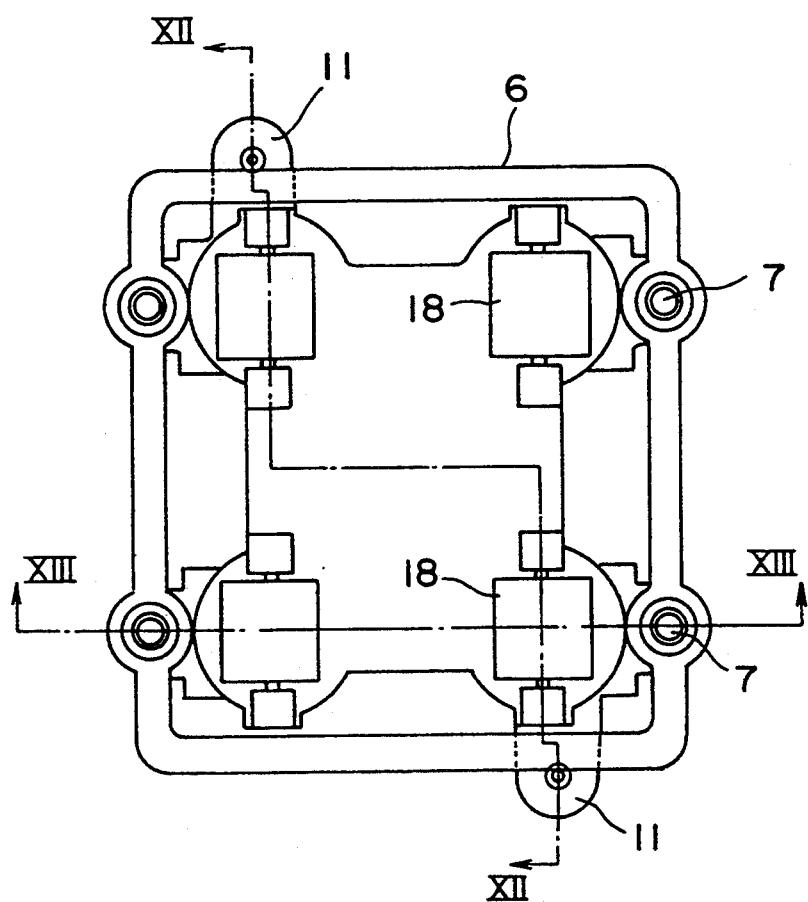
FIG. 15 is a plan view showing the new art vertical type mold clamping device to which the first embodiment of this invention is applied.
Figure 16:
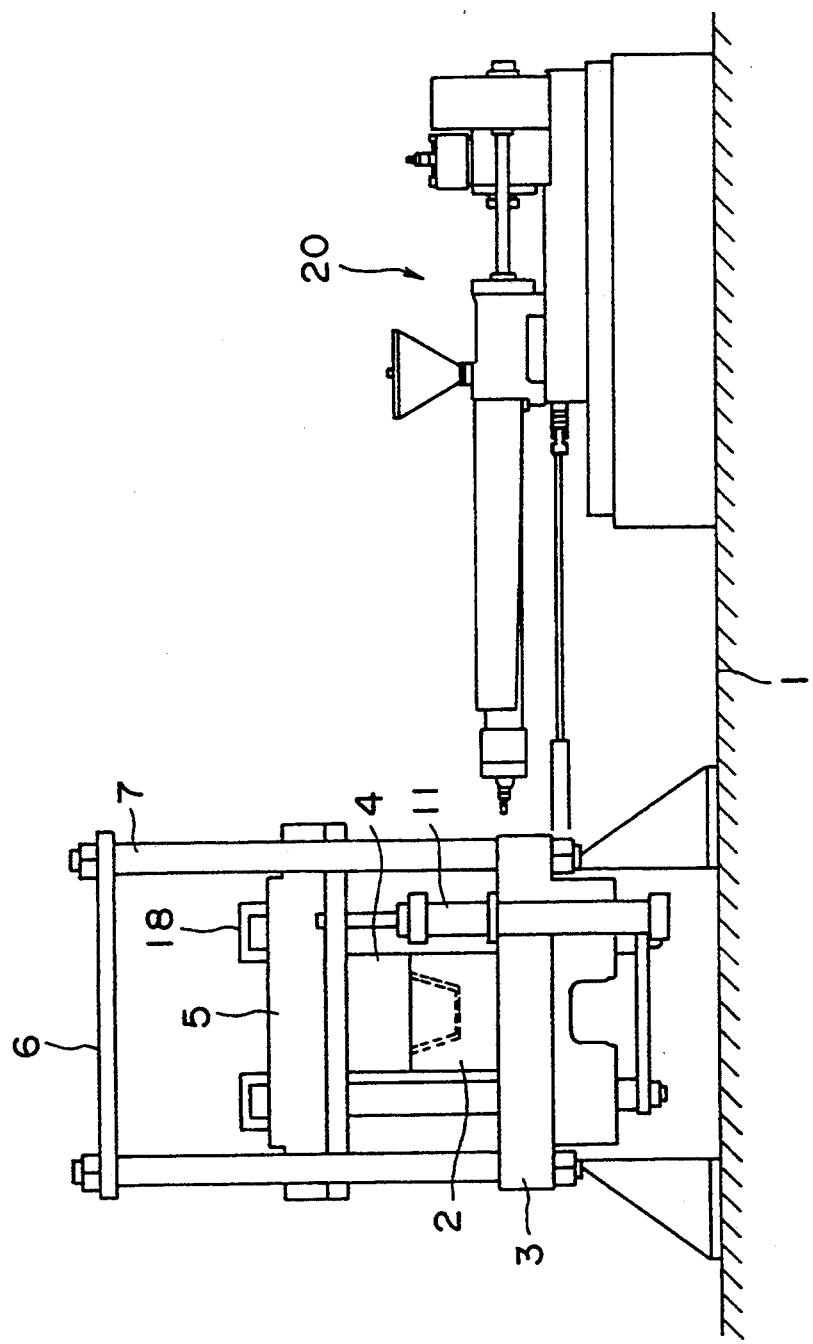
FIG. 16 is a side view showing an entire arrangement of the new art vertical type mold clamping device and an injection device.

A hanging and sliding device 725 of the hot runner 704 has four hanging bars 711 which are adapted to hang the hot runner 704 at the time of exchanging. Between the top portion of each hanging bar 711 and an intermediate member 716 is interposed a coupling member 713 rotatable over 90° as the piston rod of the swinging cylinder 712 projects or retracts. At the lower end of each hanging bar 711 is mounted a hanging member 711A as shown in FIGS. 10 and 11. A cover 704A of the hot runner 704 is formed with openings 704B for passing the hanging member 711A, the openings 704B having substantially the same configuration as the hanging member 711A.

Guide bushing 721 for guiding the hanging bars 711 are mounted on the bottom portion of a frame member 719. The upper portions of the vertically movable piston rods of two cylinders 715 are secured to the upper portion of a frame member 719. The lower portions of the vertically movable cylinder 715 engage an intermediate member 716.

The hot runner exchanging operation in a state wherein a hot runner 704 is mounted on the hot runner table 720 located in a region outside of the injection molding machine and there is no hot runner 704 in the groove 702 formed in the stationary die plate 701 will be described as follows.

Figure 5:
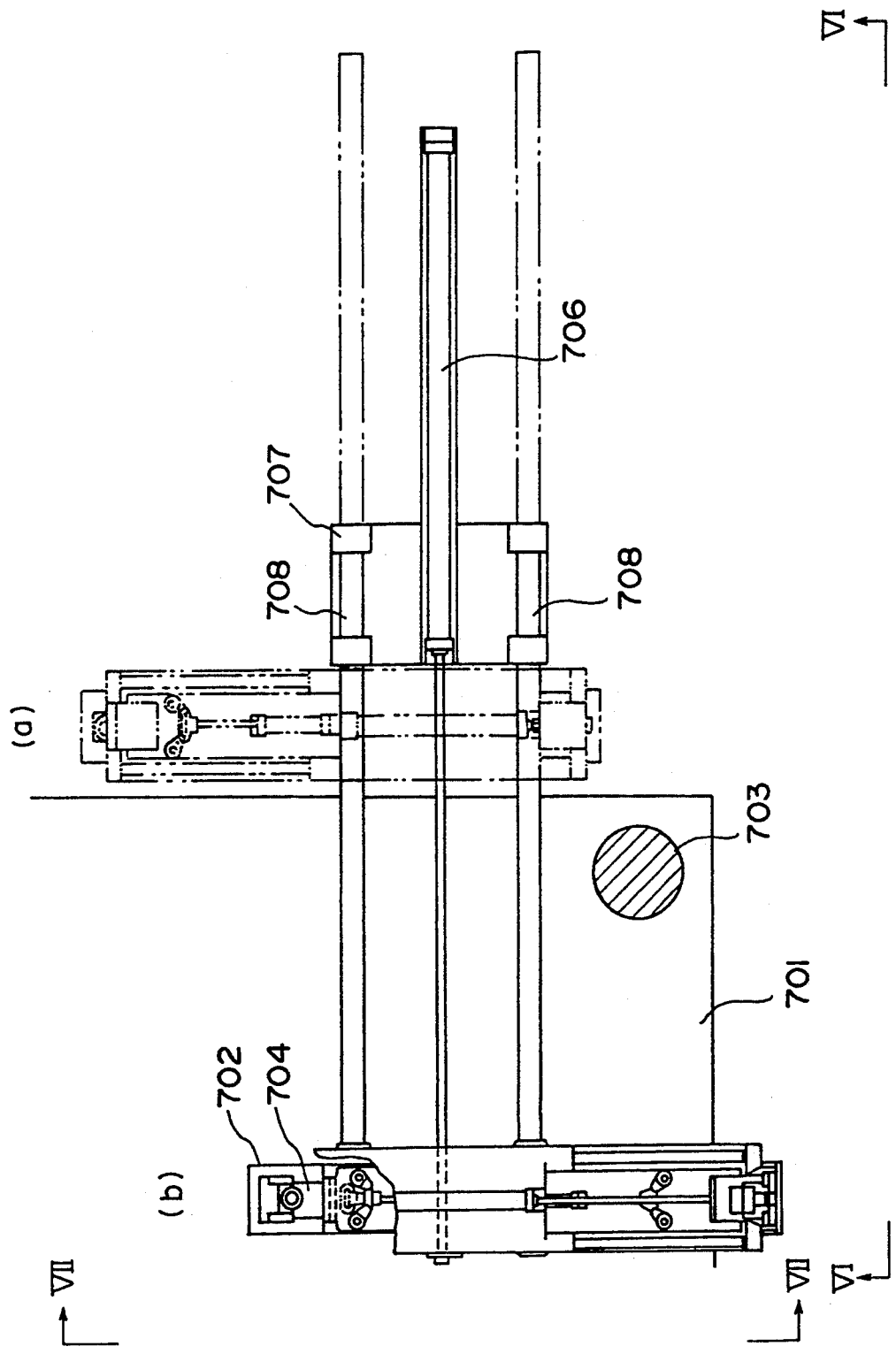
FIG. 5 is a plan view showing the hot runner exchange apparatus embodying the second embodiment of this invention.
Figure 6:
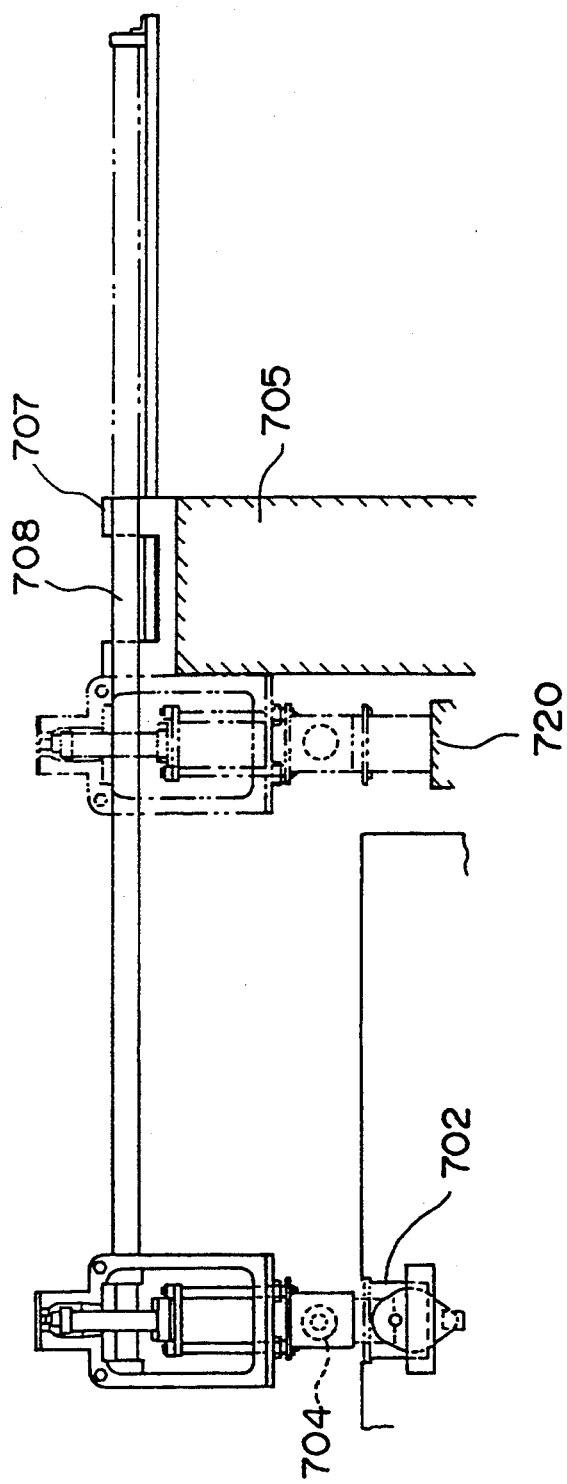
FIG. 6 is a side views as seen from a line VI—VI in FIG. 5.
Figure 7:
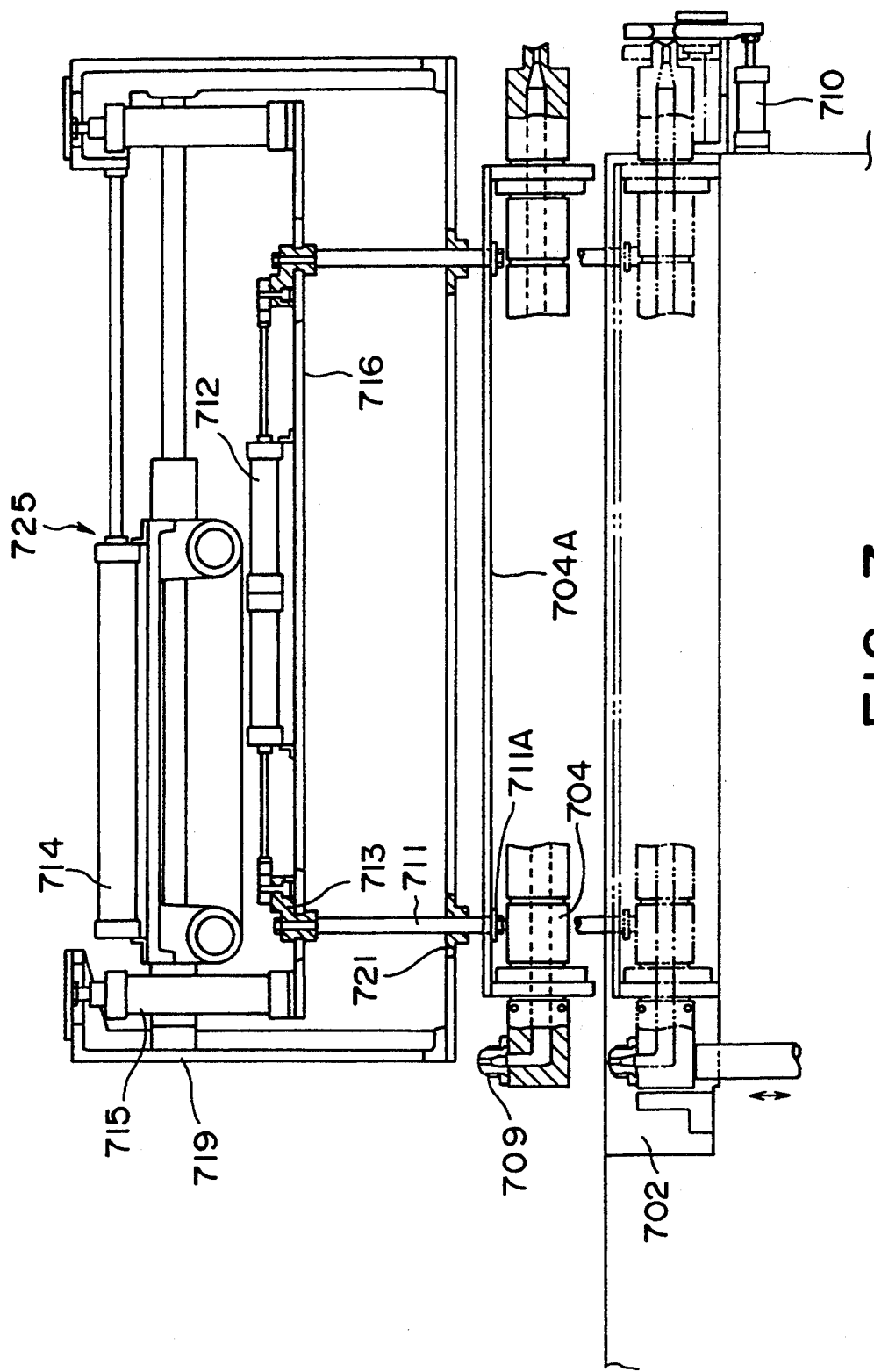
FIG. 7 is an end view as seen from a line VII—VII in FIG. 5.
Figure 8:
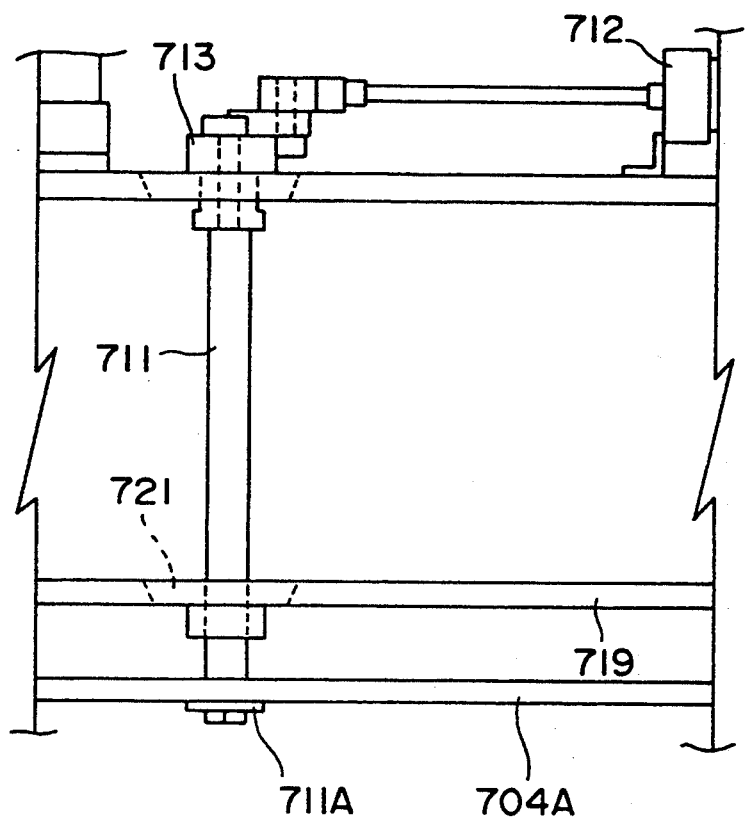
FIG. 8 is a side view of a coupling unit supporting the hot runner.
Figure 9:
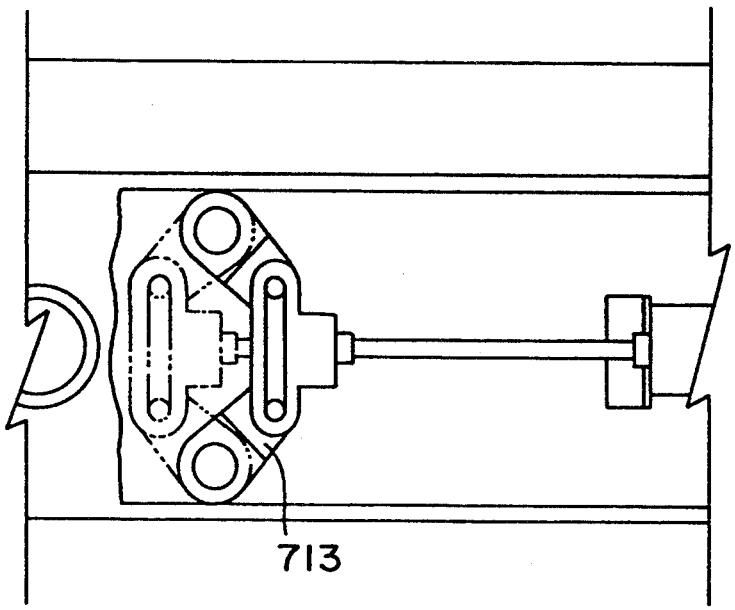
FIG. 9 is a plan view showing the coupling unit shown in FIG. 8.

At first, taking in and taking out cylinder 706 is operated for positioning the hanging and sliding device 725 to an upper portion (position (a) shown in FIG. 5) of the hot runner table 720 on which the hot runner 704 has been set. Then the vertically movable cylinders 715 are operated for lowering the intermediate member 716, the hanging rod 711 are inserted into openings 704B formed at the cover 704A. Then the piston rods of the cylinder 712 for swinging the hanging members 711A are protruded to push the coupling members 713 thereby rotating hanging bars 711 by 90° to interconnect the hanging and sliding device 725 and the hot runner 704. Under this condition, the piston rods of the vertically movable cylinders 715 are retracted, whereby the hot runner 704 will be movably hung on hanging bars 711 secured to the intermediate member 716.

Then the taking in and taking out cylinder 706 is operated for moving the hanging and sliding device 725 to a predetermined position (position (b) shown in FIG. 5) in the injection molding machine. At this time, for the purpose of avoiding interference with the tie bar 703 extending through the stationary die plate 701 the taking in and taking out cylinder 706 is actuated to move the hanging and sliding device 725 to a point on the extension of the under line of the groove 702 formed in the stationary die plate 701. Then the sliding cylinder 714 is actuated to move the hanging and sliding device 725 to a predetermined position in the groove 702. Thereafter the vertically movable cylinders 715 are operated for lowering the hanging bars 711 for setting the hot runner 704 at a predetermined position in the groove 702 formed in the stationary die plate 701. Then, the piston rods of the hanging and swinging cylinder 712 are retracted to rotate the coupling members 713 by 90° in the opposite direction, and the vertically movable cylinders 715 are actuated for disengaging the hanging bars 711 from the cover 704A of the hot runner 704.

Thereafter, the sliding cylinder 714 and the taking in and taking out the cylinder 706 are operated according to a procedure opposite to that of taking in whereby the hanging and sliding device 725 is hung up to the original position (a) shown in FIG. 5 without avoiding interference with the tie bar 703.

This operation completes the movement of the hot runner 704. Then by using the supporting cylinder 710, the positions of various parts of the hot runner 704 are finely adjusted.

Where the hot runner 704 is located in the groove 702 formed in the stationary die plate 701 and where the hot runner is taken out of the injection molding machine and the other hot runner is taken into the injection molding machine, a procedure opposite to that described above is performed. At that time for completing the exchange in a short time, a space is provided in which a hot runner 704 taken out at position (a) shown in FIG. 5 and the other hot runner are placed juxtaposed, or a carriage for moving the hot runner may be used.

Although in the embodiment described above, cylinder are used for vertically or horizontally moving the hung hot runner, another moving means can be used. For example, a ball screw can be moved by an electrical means.

As has been described in detail, since according to this invention, the hot runner can be exchanged readily and in a short time in an injection molding machine, a rapid color change and resin change are possible for an injection molding machine for producing products of various types, each in small numbers.

The following description concerns a vertical type mold clamping device utilized in the embodiment described above. This vertical type mold clamping device has a low height, a small weight of movable parts and suitable for a high cycle running.

Figure 17:
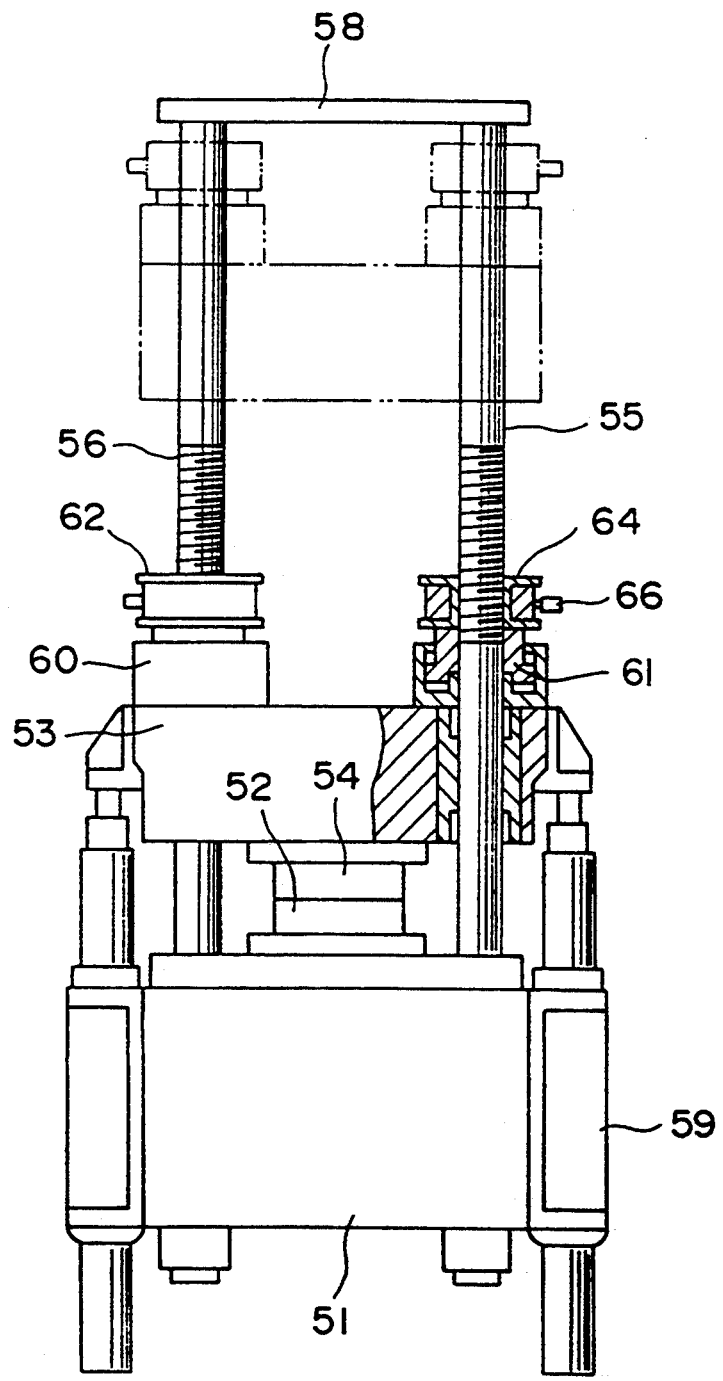
FIG. 17 is a front view, partly in section showing a prior art vertical type mold clamping device.

Among various type prior art mold clamping devices, one example thereof having a relatively simple construction is disclosed in Japanese Patent Publication No. 54574/1986. The construction and operation of the prior art mold clamping device will be described with reference to FIG. 17 showing this prior art which comprises a movable board 53 carrying an upper metal mold 54, a stationary board 51 supporting a lower metal mold 52, a plurality of tie rods 55 vertically mounted on the stationary board 51 for guiding movable board 53, a plurality of boost cylinders 59 secured to the stationary board 51 for permitting the movable board 53 to move in the vertical direction, a connecting plate 58 interconnecting the upper ends of tie rods 55, mold clamping cylinders 60 through which the tie rods 55 extend, pistons 61 contained in the clamping cylinders 60, and locking members 62 mounted above the mold clamping cylinders 60 to surround the tie rods 55.

The boost cylinders 59 are actuated to lower the movable board 53 to cause the upper metal mold 54 to engage the lower metal mold 52. The locking member 62 has a well known half nut 64 driven by an opening and closing cylinder 66 and arranged to mesh with threaded portions 56 formed on the surfaces of the tie rods 55. At the time when the upper and lower metal molds 54 and 52 are brought to contact with each other, the cylinder 66 is actuated to cause half nut 64 to mesh with the threaded portions 56 of tie rods 55. At this time, it is necessary to rotate the tie rods 55 such that the half nut 64 correctly meshes with the threaded portions. Thereafter, pressurized oil is supplied to mold clamping cylinders 60 to urge downwardly the movable board 53 by pistons 61, thereby clamping together both metal molds 52 and 54.

As above described, even in a prior art mold clamping device, the height of the device can be reduced and a predetermined mold clamping can be done by using long boost cylinders 59.

This prior art technique has the following defects:

(1) Since the mold clamping cylinders 60 are mounted on the movable board 53, the weight of the vertically movable parts is large, thus requiring a large driving power. Moreover, since the position of the center of gravity of the movable parts is high, lateral swinging generates at the time of vertical motion of the movable board 53, thus lacking operability and stability, and it was difficult to decrease the operating cycle.

(2) Since the mold clamping cylinders are located above both metal molds, when the pressurized oil for driving the mold clamping cylinders leaks through the sliding portion between the pistons and tie rods, there is a fear that the leaked oil would reach the mold surface along the surface of tie rods thereby degrading the quality of the molded products.

(3) Since the mold clamping cylinders are located at high positions, the maintenance of the packings of the mold clamping cylinders was troublesome.

The following described embodiment of a vertical type mold clamping device is achieved to overcome the above mentioned defects.

In FIGS. 12–16, on a floor 1 are installed a horizontal type injection molding machine and a vertical type mold clamping device. The mold clamping device comprises mold clamping cylinders 8 driven by pressurized oil or the like and containing pistons 9 therein, and a stationary die plate 3 supporting a stationary metal mold 2. Mold clamping rods 10 moved in the vertical direction by pistons 9 extend upwardly through the stationary die plate 3. A movable die plate 5 is provided above the stationary die plate 3 and moved in the vertical direction toward and away from the stationary die plate 3 by boost cylinders 11 through piston rods 13 thereof. The lower ends of guide rods 7 whose upper ends are interconnected by a connecting plate 6 are secured to the upper surface of the stationary die plate 3.

Openings 15 for slidably receiving the mold clamping piston rods 10 are formed through the movable die plate 5. On the upper ends of the openings 15 are secured engaging means 18 each including a stop member 17 to be engaged by the upper end of the mold clamping piston rod 10 and a halfnut 16 meshing with a threaded portion 14 at the upper end of the piston rod 10. Each halfnut 16 is actuated by a halfnut driving device 19 driven by fluid pressure to reciprocate the halfnut in a direction perpendicular to axis of the opening 15.

In operation, pressurized oil is supplied to the upper sides of pistons 12 in the boost cylinders 11 for moving the movable die plate toward the stationary die plate, and immediately before completion of the closure of the stationary metal mold 2 and the movable metal mold 4, the upper ends of the piston rods 10 come to engage the stop members 17 at the upper ends of openings 15.

Each engaging member 18 is constituted by a cylinder closed its upper end with stop member 17 and moves together with the vertical motion of the movable die plate 5. When the movable die plate 5 is lowered to a predetermined position, the upper ends of the mold clamping piston rods 10 come to engage the stop members 17. Then the halfnut 16 is moved toward the axis of the opening 15 for causing the halfnut to mesh with the threaded portions 14 of the mold clamping piston rod 10. Since the distance between the halfnut 16 and the axis of the opening 15 is constant, and since the relative position between the threaded portion 14 of the piston rods and the stop member 17 is not varied, the phase of the threaded portion of the piston rod 10 when the end of piston rod 10 engages the stop member 17 and the phase of the threads of the halfnut are always match so that it is possible to maintain the phase of the threaded portion 14 of the piston rod 10 when the end of piston rod 10 engage against the stop member 17 and the phase of the threads of the halfnut 16 are always matched.

The meshing operation of the threaded portion 14 of the piston rod 10 and the halfnut 16 starts from a time when the upper end of the piston rod 10 engages against the stop member 17 and completes when the movable metal mold 4 and the stationary metal mold 2 contact with each other and the mold clamping operation is completed by supplying pressurized oil to the mold clamping cylinders 8 for driving the inner pistons 12.

The vertical mold clamping device described above has the following advantages:

(1) Since a plurality of guide rods are provided with their lower ends secured to the stationary die plate, the upper ends interconnected by the connecting plate and extending through the movable die plate to be movable in the vertical direction, the mold clamping device can resist tilting and vibration, thus manifesting a large stability.

(2) Since heavy mold clamping cylinders are formed in the stationary die plate located at the lower most position and since the boost cylinders for vertically moving the movable die plate are secured to both sides of the stationary die plate, the height of the mold clamping device can be made low as far as possible, and the position of the center of gravity of the machine can be lowered by decreasing the weight of the movable parts applying a load upon the movable die plate, thereby improving the operability, decreasing the vibration of the machine and enabling high cycle operation of the mold clamping device.

(3) Since the vertical movement of the movable die plate is guided by an independent guide means, it is possible to decrease the influence of the vibration generated at the time of vertical movement of the movable die plate upon the sealing members of the mold clamping cylinders.

(4) Since the mold clamping cylinders are formed in the stationary die plate located at a position lower than the metal mold even when oil leakage occurs due to wear of the sealing members of the mold clamping cylinders, it is possible to prevent degradation of the quality of the molded product and to make easy the maintenance of the device, such as exchange of the sealing members.

(5) Since the meshing of the halfnut and the threaded portions of the mold clamping piston rods is started when the upper ends of the mold clamping piston rods engage against the stop members, the running time of the mold clamping device can be shortened.

In this embodiment, the guide rod 7 is able to be used as the guide rod 506 described in the first embodiment of this invention.

FIGS. 18 through 22 shown the third embodiment of this invention.

The embodiment of the hot runner exchange apparatus shown in FIGS. 18 through 22 comprises a stationary die plate 101, a groove 102 (see FIG. 21) formed in the stationary die plate 101, a hot runner 103 positioned at a predetermined position of the groove 102, a nozzle 104 arranged at one end of the hot runner 103, a hot runner supporting member 105, and a hook 106 which rotatably secured by a pin 107 to one end of the hot runner 103.

There is provided a push-pull device 108 of the hot runner 103. The push-pull device includes sprocket wheels 109 and 110 and a roller chain 111 is passed around sprocket wheel. The push-pull device is driven by a reversible motor 112 connected to the sprocket wheel 110.

Figure 18:
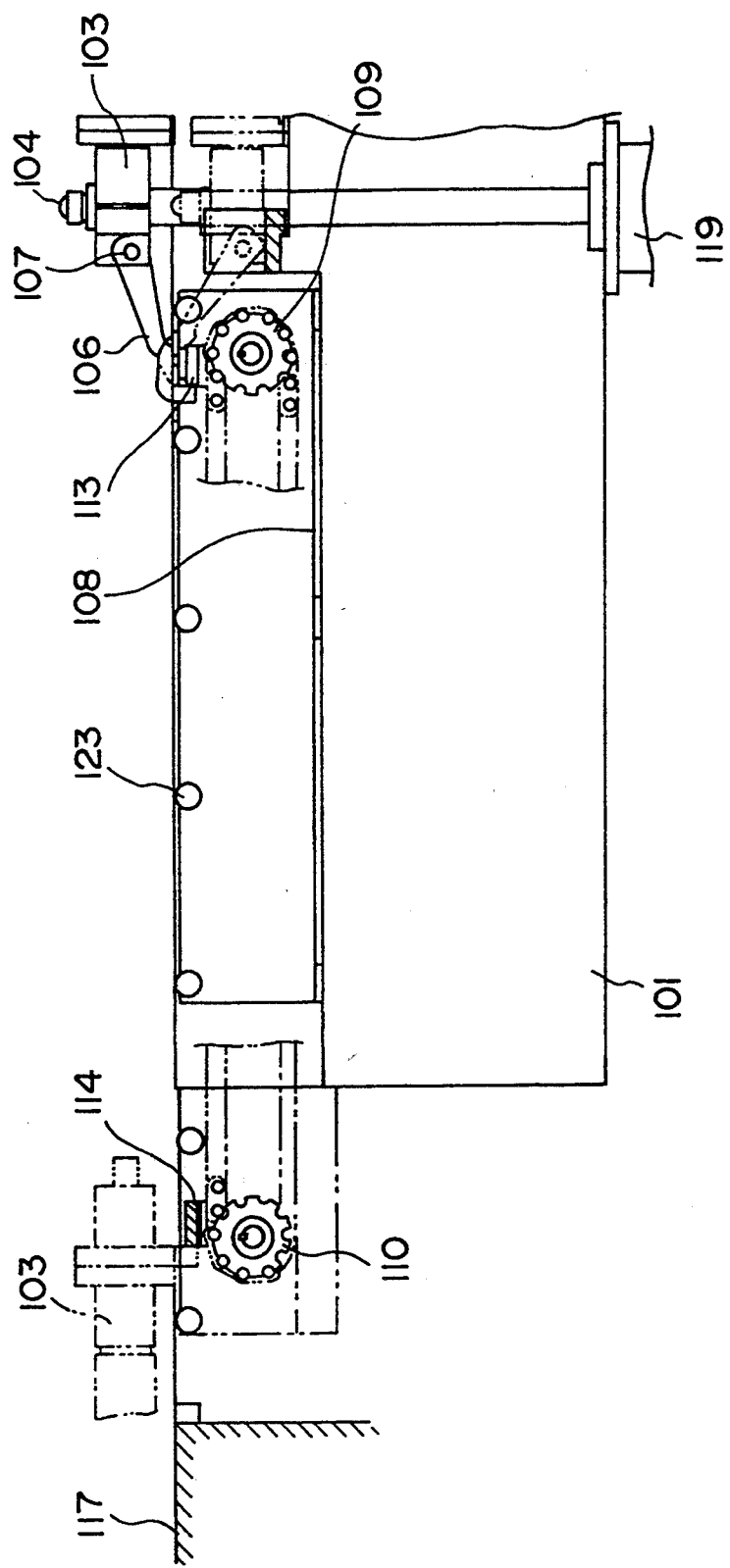
FIG. 18 is a side view, partly in section, showing the hot runner exchange apparatus according to the third embodiment of this invention.
Figure 19:
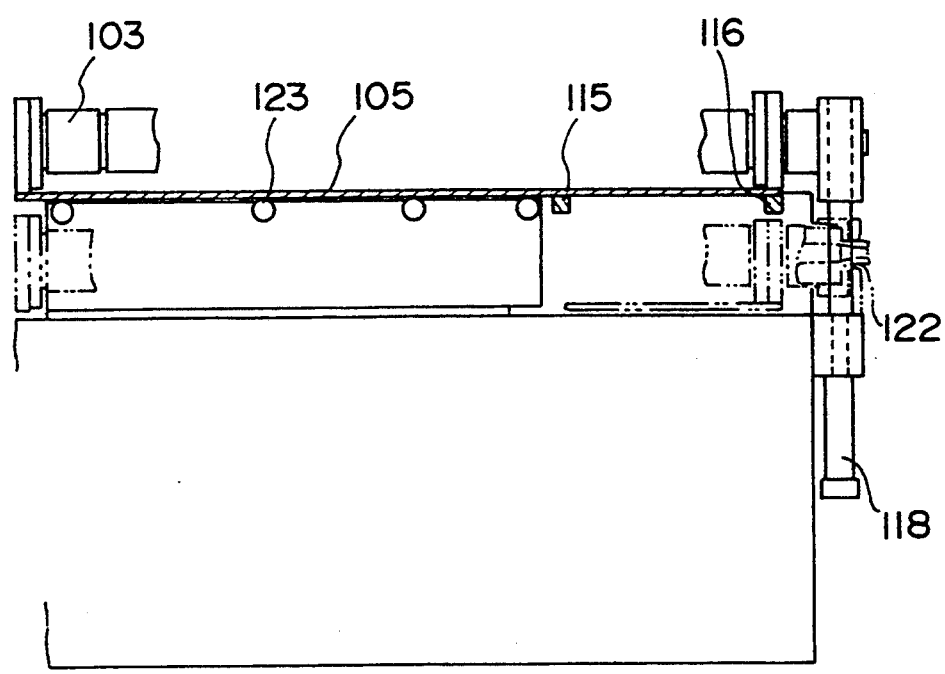
FIG. 19 is another side view of the hot runner exchange apparatus.
Figure 20:
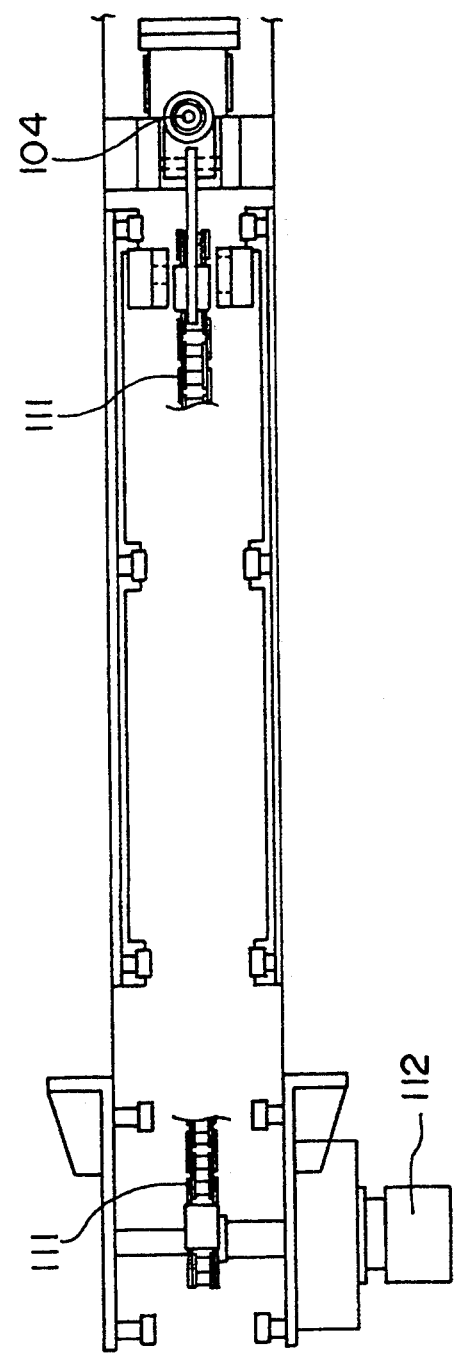
FIG. 20 is a plan view, partly in section, of the hot runner exchange apparatus shown in FIG. 18.
Figure 21:
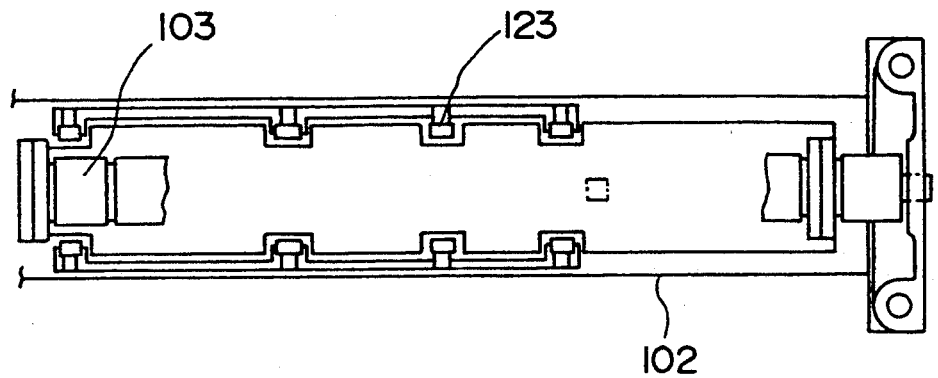
FIG. 21 is another plan view of the hot runner exchange apparatus.
Figure 22:
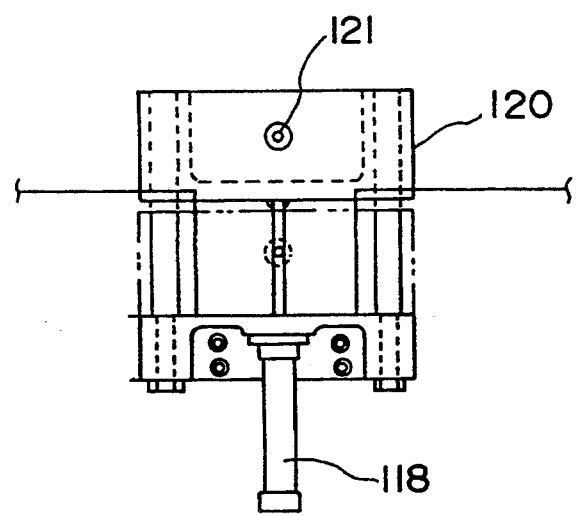
FIG. 22 is a right side end view of the hot runner exchange apparatus shown in FIG. 9.

Push-pull blocks 113 and 114 are attached to the roller chain 111 at a constant spacing so that when the sprocket wheel 10 is rotated in the counterclockwise direction as viewed in FIG. 18, the push-pull block 113 is moved toward left while engaging the front end of hook 106, whereby the hot runner 103 mounted on the hot runner supporting member 105 is moved to the left on roller 123.

As the push-pull block 113 passes about sprocket wheel 110, the hook 106 is disengaged from the push-pull block 113 but by continuously rotating the sprocket wheel 110, an engaging member 115 mounted on the lower surface of the hot runner supporting member 105 engages with the push-pull block 113 to further move the hot runner 103 to the left. When the push-pull block 114 reaches the sprocket wheel 110, it is caused to disengage from the engaging member 115. However as the rotation of the sprocket wheel 110 is continued, an engaging member 116 secured to the lower surface of the hot runner supporting member 105 engages the push-pull block 113 to advance further the hot runner 103 to the left to bring the hot runner 103 to a position (shown by dot and dash lines) at the left upper position of FIG. 18, thereby permitting to take out the hot runner to the outside of the machine.

The hot runner 103 which has been taken out by the procedure described above is exchanged with a hot runner to be used on the table 117. The operation opposite to that described above is repeated by rotating motor 112 in a direction opposite to that of taking out the hot runner so as to mount the hot runner at a predetermined position above the groove 102. By synchronizing the operations of the positioning cylinder 118 and a nozzle urging cylinder 119, the exchanged hot runner can be held at the raised position.

A nozzle touch portion 122 is inserted into an opening 121 of a positioning block 120. Thereafter by lowering the positioning cylinder 118 and urging the cylinder 119, the hot runner is maintained at a predetermined position in the groove 102 of the stationary die plate 101.

The fourth embodiment of this invention will be described as follows with reference to FIGS. 23 through 25.

Figure 23:
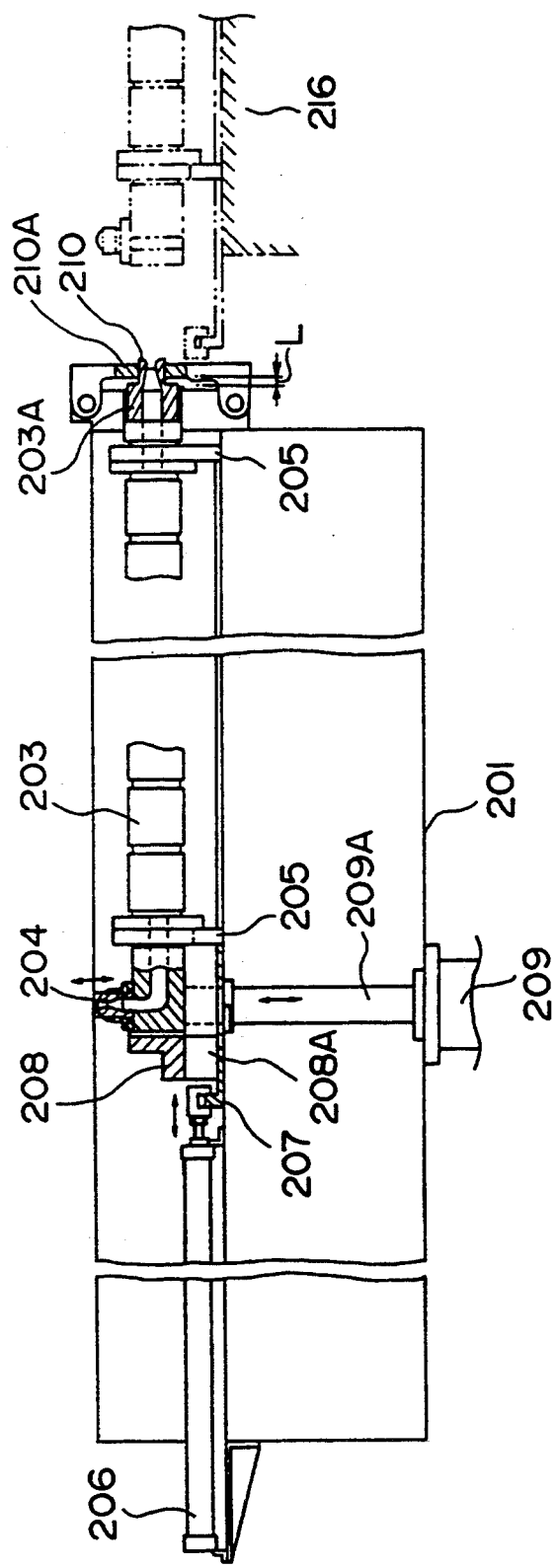
FIG. 23 is a side view, partly in section, showing the fourth embodiment of this invention.
Figure 24:
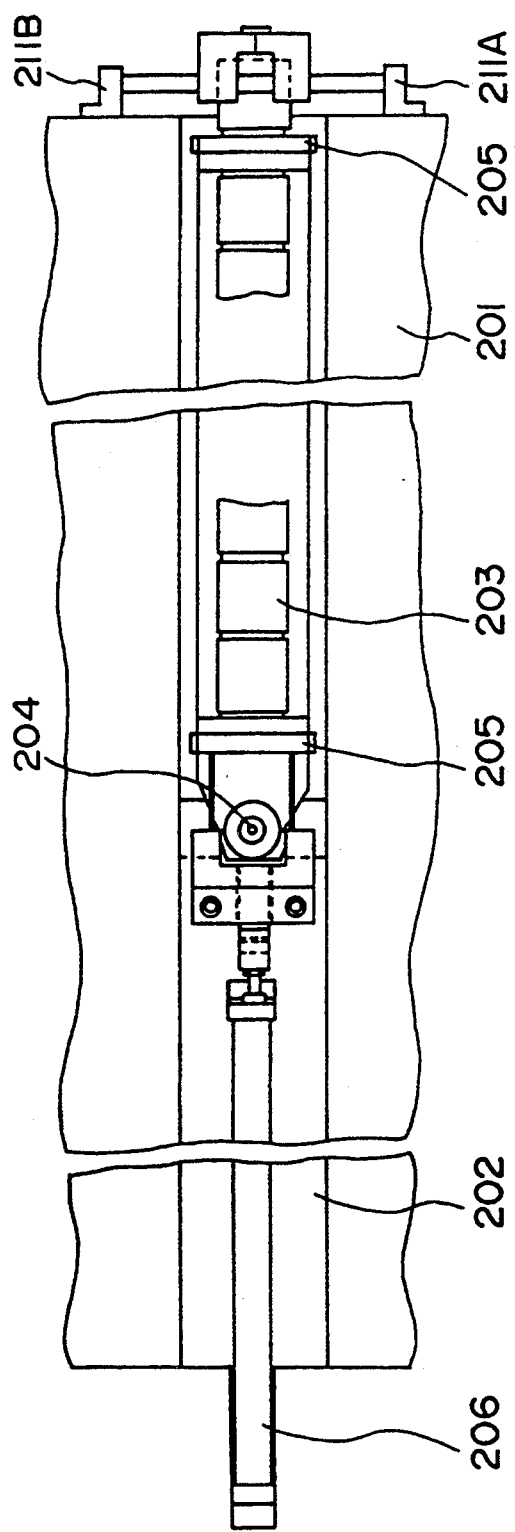
FIG. 24 is a plan view showing the hot runner exchange apparatus shown in FIG. 23.
Figure 25:
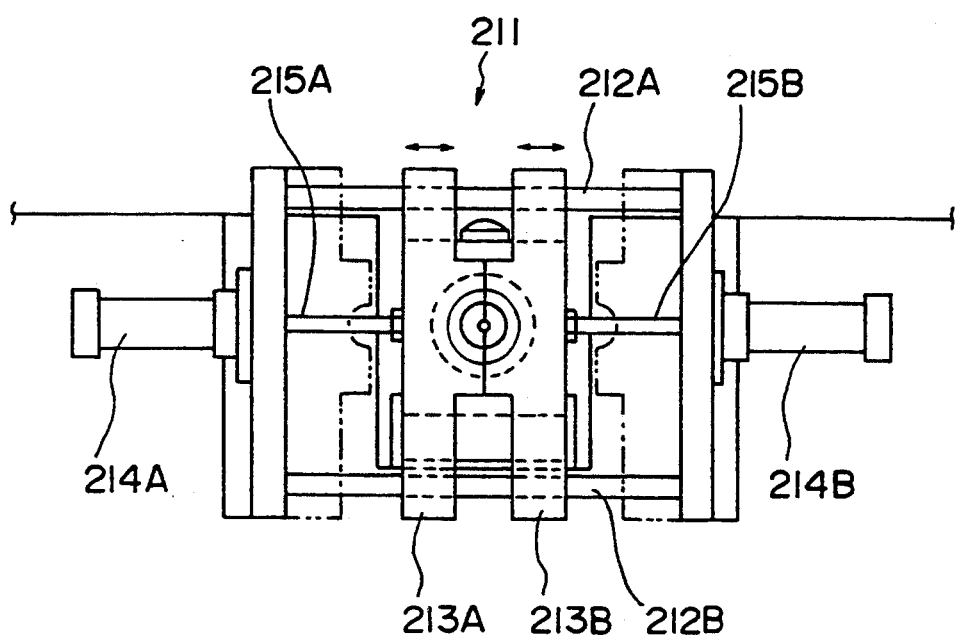
FIG. 25 is a right side end view of the hot runner exchange apparatus shown in FIG. 23.
Figure 26:
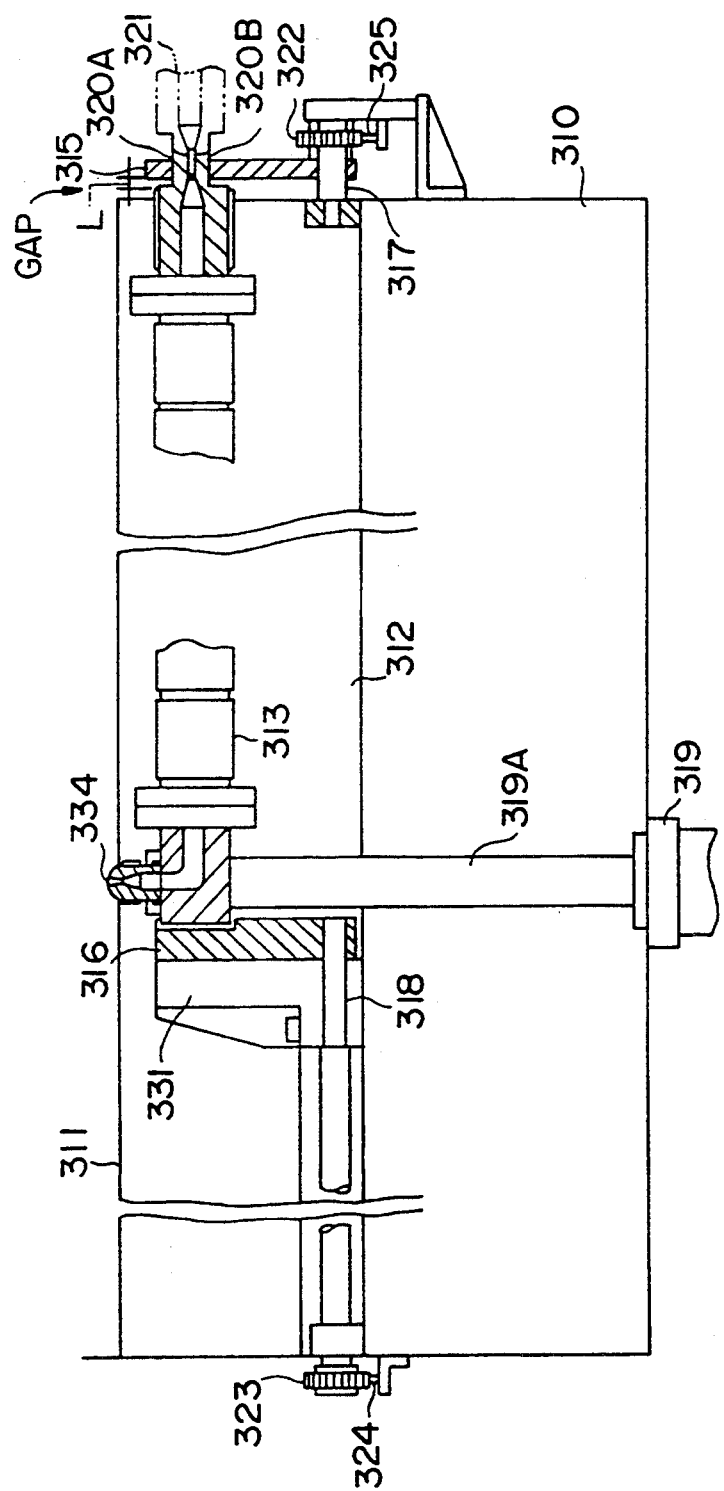
FIG. 26 is a front view showing the fifth embodiment of this invention.
Figure 27:
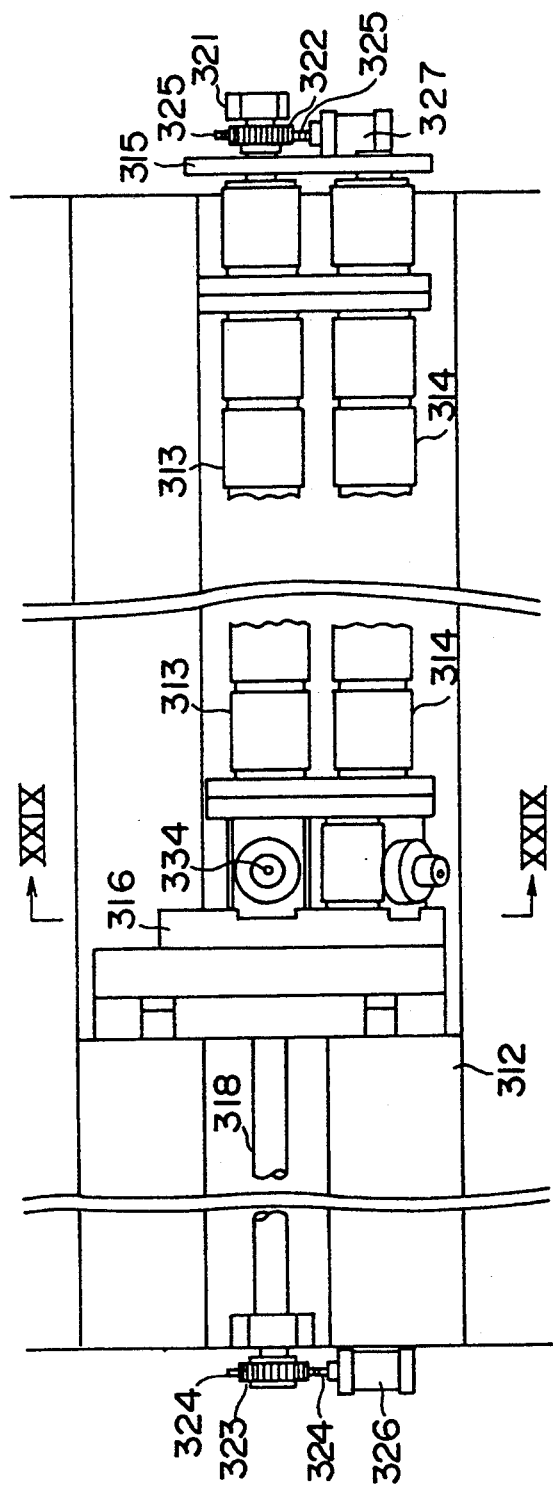
FIG. 27 is a plan view of the hot runner exchange apparatus shown in FIG. 26.
Figure 28:
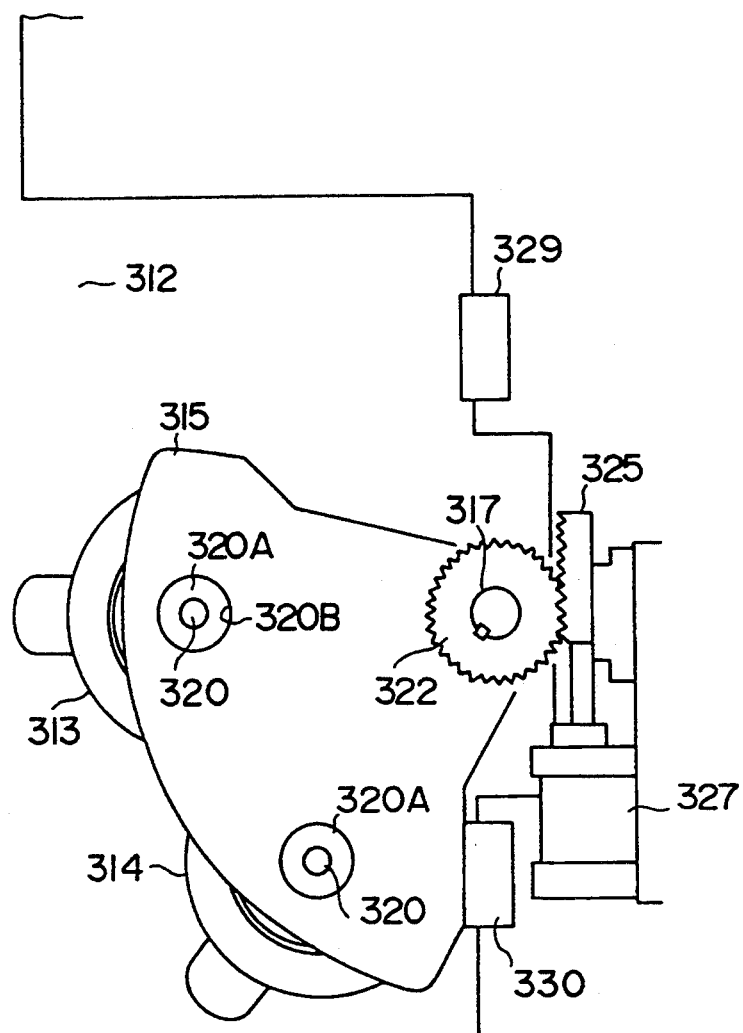
FIG. 28 is a right side view of the hot runner exchange apparatus shown in FIGS. 26 and 27.
Figure 29:
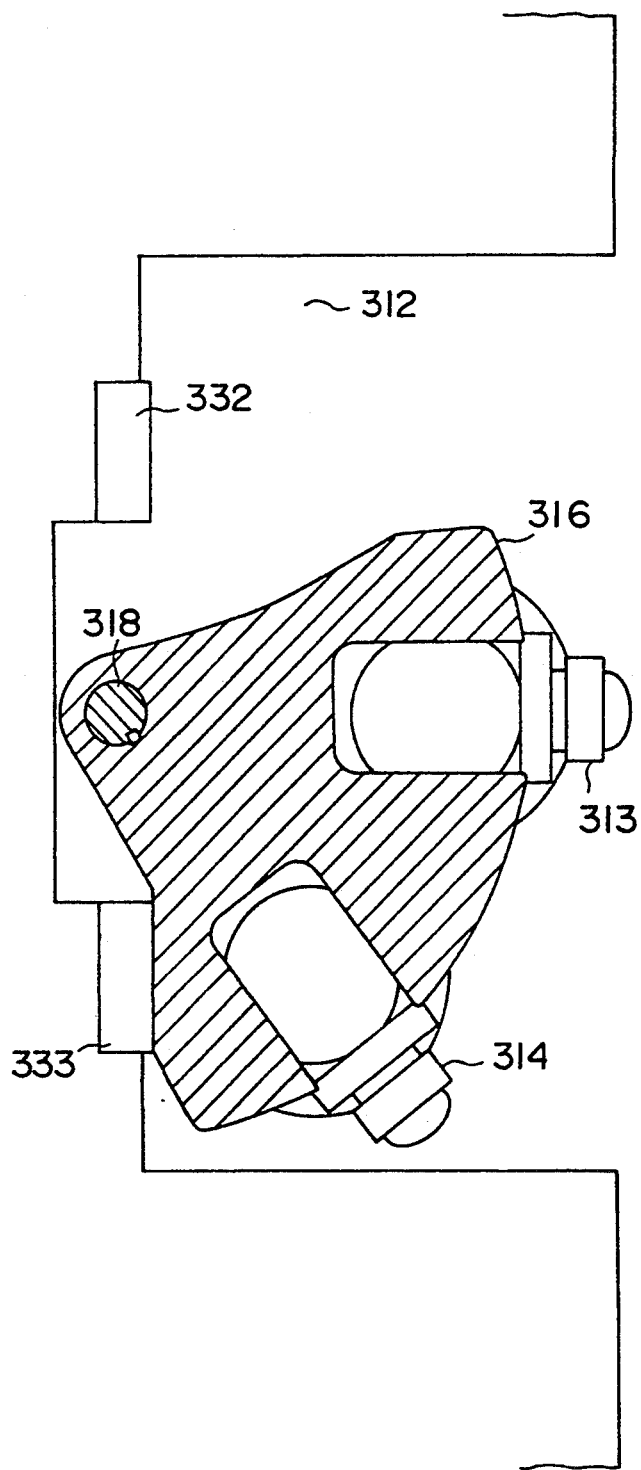
FIG. 29 is a sectional view taken along a line XXIX—XXIX in FIG. 27.

The hot runner exchange apparatus shown in FIGS. 23 through 25 comprises a stationary die plate 201 for supporting the stationary metal mold, a groove 202 formed on the stationary die plate 201, a hot runner 203 installed in the groove 202, a nozzle 204 provided for one side of the hot runner 203, a supporting member 205 for supporting the hot runner 203, a push-pull cylinder 206 for reciprocating the hot runner 203 in the axial direction thereof, a connecting member 207 secured to the supporting member concurrently reciprocated by the push-pull cylinder 26 with the hot runner 203 in the axial direction thereof, a stop member 208 for positioning the hot runner 203, a notch 208A of the stop member 208 and an urging cylinder 209 for urging the nozzle 204 against the metal mold. The urging cylinder 209 pushes upwardly the hot runner 203 for causing the nozzle 204 to touch against the metal mold. A nozzle touch portion 210 is mounted on a side of the hot runner 203 for causing the nozzle of an injection device (not shown) to snugly fit with the hot runner.

A positioning and holding device 211 of the nozzle touch portion 210 is mounted at the end of stationary die plate 201, and mounting brackets 211A and 211B are also secured to the stationary die plate 201. The mounting brackets 211A and 211B are interconnected by guide bars 212A and 212B respectively. Nozzle positioning and holding blocks 213A and 213B are respectively guided by the guide bars 212A and 212B and are connected to piston rods 215A and 215B of cylinders 214A and 214B respectively for opening and closing the blocks 213A and 213B, the piston rods 215A and 215B being connected to the nozzle positioning and holding blocks 213A and 213B respectively.

A small diameter portion 210A (see FIG. 23) is formed at a portion of the positioning and holding device 211, which engages a nozzle touch portion 210 of the hot runner 203, for clamping the hot runner 203 to position and hold the hot runner. Gaps L are formed between the hot runner end portion 203A and blocks 213A and 213B for absorbing the elongation of the hot runner.

The hot runner exchange operation after completion of the injection of the molten resin into the metal mold from an injection device (not shown) will now be described.

At first, the piston rod 209A of the urging cylinder 209 is lowered to lower the nozzle 204 to a position lower than the metal mold. Then the nozzle positioning and holding blocks 213A and 213B are opened in the horizontal direction by operating the opening and closing cylinders 214A and 214B for releasing the hot runner end portion 203A.

The push-pull cylinder 206 is actuated to transfer hot runner 203 upon hot runner table 216 on the outside of the injection molding machine. Prior to this transfer, a next hot runner to be exchanged is mounted on the hot runner table. At this time, it is advantageous to preheat the new hot runner to be exchanged.

The new and old hot runners are slid on the hot runner table 216 to insert and set in a position corresponding to the groove 202 and the push-pull cylinder 206 and the connecting member 207 are interconnected. Then the push-pull cylinder 206 is operated to a side opposite to the injection device for causing the end of the new hot runner to engage the stop member 208 and to stop the new hot runner.

Finally, after clamping the end of the new hot runner by the positioning and holding device 211 and then urge the nozzle against the metal mold by the urging cylinder 209 thereby completing exchange of hot runners. This modification has the same advantages as the before described embodiment.

Another example of the hot runner exchange apparatus will now be described with reference to FIG. 26 through FIG. 33.

This modification shown in FIGS. 26–29 comprises a stationary die plate 310 for supporting a stationary metal mold, a stationary metal mold mounting surface 311, a groove 312 formed in the stationary die plate 310, a first hot runner 313, a second hot runner 314 disposed in the groove 312, a sector 315 for supporting the righthand end of the hot runner, and another sector 316 for supporting the lefthand end of the hot runner. The right side sector 315 is formed with separated openings 320B for inserting right side small diameter portions 320A of the first and second hot runners 313 and 314 for positioning nozzles 320. The small diameter portion 320A is received in a swingable manner in an opening 320B of the sector 315. A gap L between hot runners 313 and 314, and sector 315 permits a dimensional change of the hot runner caused by thermal expansion. For these reasons, the hot runners 313 and 314 can swing and slide slightly in the longitudinal direction.

The front end of the heating barrel of the injection device is designated by 321 and the righthand sector 315 is fit with righthand nozzles 320 of the hot runner. The left side sector 316 is fit with the lefthand ends of the hot runners 313 and 314. Above the left and right sectors 315 and 316 are formed the opened grooves 312. The left and right sectors 315 and 316 are secured to shafts 317 and 318 about which the sectors are swung.

Means for swinging comprises cylinders 327 and 326 mounted on the left and right ends of shafts 317 and 318. The righthand cylinder 327 drives a rack 325 meshing with a pinion 322 secured to the righthand end shaft 317. Positioning members 329 and 330 for determining the swinging positions of the righthand sector 315 are secured to the stationary die plate 310. The center portion of the lefthand sector 316 is secured to a shaft 318 extending through a bearing member. Like the righthand side, the shaft 318 is rotated when the cylinder 326 moves a rack 324 meshing with a pinion 323. 332 and 333 denote swinging positioning members of the lefthand sector 316.

A nozzle urging cylinder is denoted by 319. By the vertical motion of the piston rod of this cylinder 319, a vertically movable nozzle 334 is moved toward and away from the stationary metal mold.

A case wherein the first hot runner 313 now being used is substituted by the second hot runner will be described with reference to FIGS. 26 through 29.

Firstly, the piston rod 319A of the nozzle urging cylinder 319 is lowered. After completing the nozzle urging operation, the nozzle 334 is lowered beneath the metal mold mounting surface 311. Then the left and right cylinders 327 and 326 are actuated synchronously to withdraw their piston rods. Then racks 325 and 324 connected to the piston rods are moved to swing sectors 316 and 315 until they engage against positioning members 332 and 329 and stopped.

In a manner as above described instead of the first hot runner 313, the second hot runner 314 can be set at a predetermined operating position. Then the nozzle urging cylinder 319 is operated to project the piston rod 319A. Thus, the hot runner is urged against the metal mold thereby completing a preparation operation. Then the injection molding machine begins a new injection molding operation.

FIGS. 30–33 show still further embodiment of this invention. This embodiment comprises a stationary die plate 350 for mounting a stationary metal mold, a stationary metal mold mounting surface 351, a groove 352 formed in the stationary die plate, a third hot runner 353 set in the groove 352, a fourth hot runner 354 154, supporting blocks 355 and 356 for supporting both ends of the third and fourth hot runners, supporting plates 361 and 358 for guiding and supporting the supporting blocks 355 and 356, guide bars 361A and 358A, and cylinders 367 and 366 for reciprocating supporting blocks 355 and 356.

Figure 30:
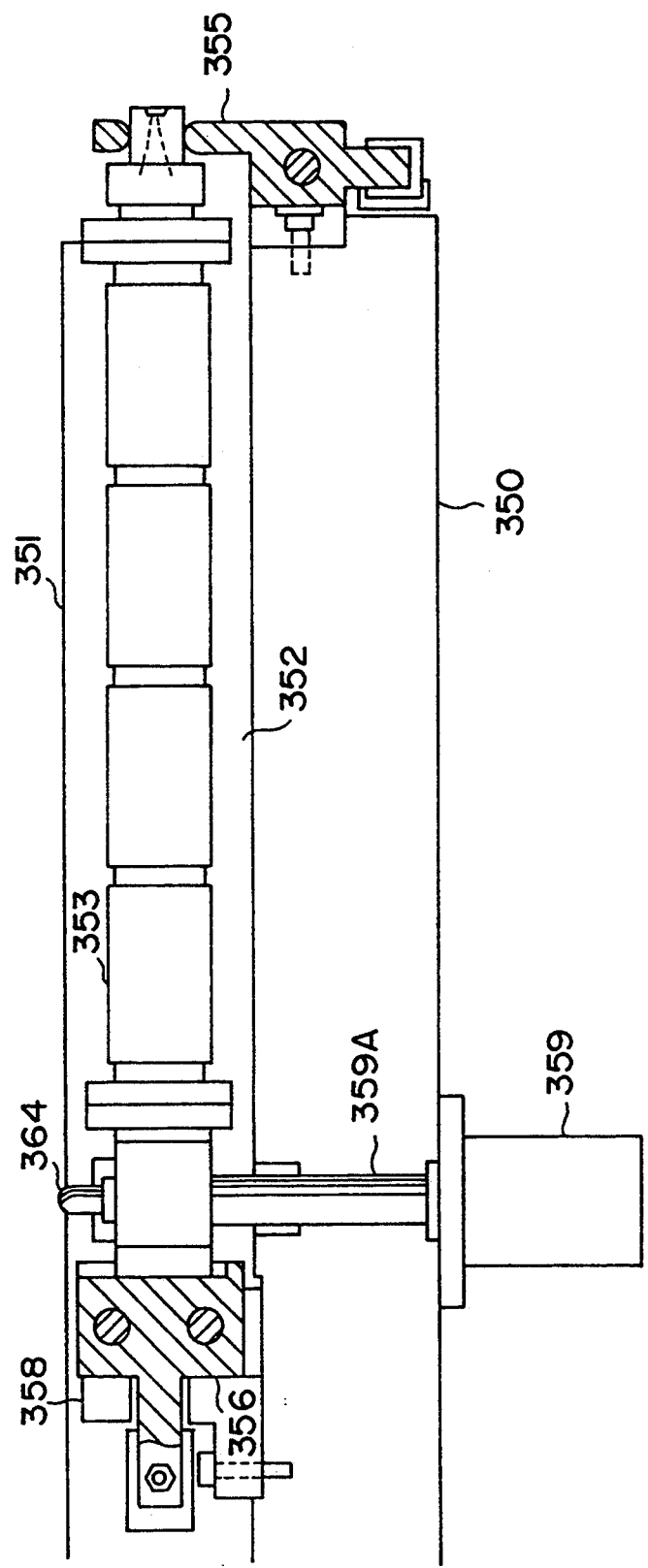
FIG. 30 is a front view, partly in section showing the sixth embodiment of this invention.
Figure 31:
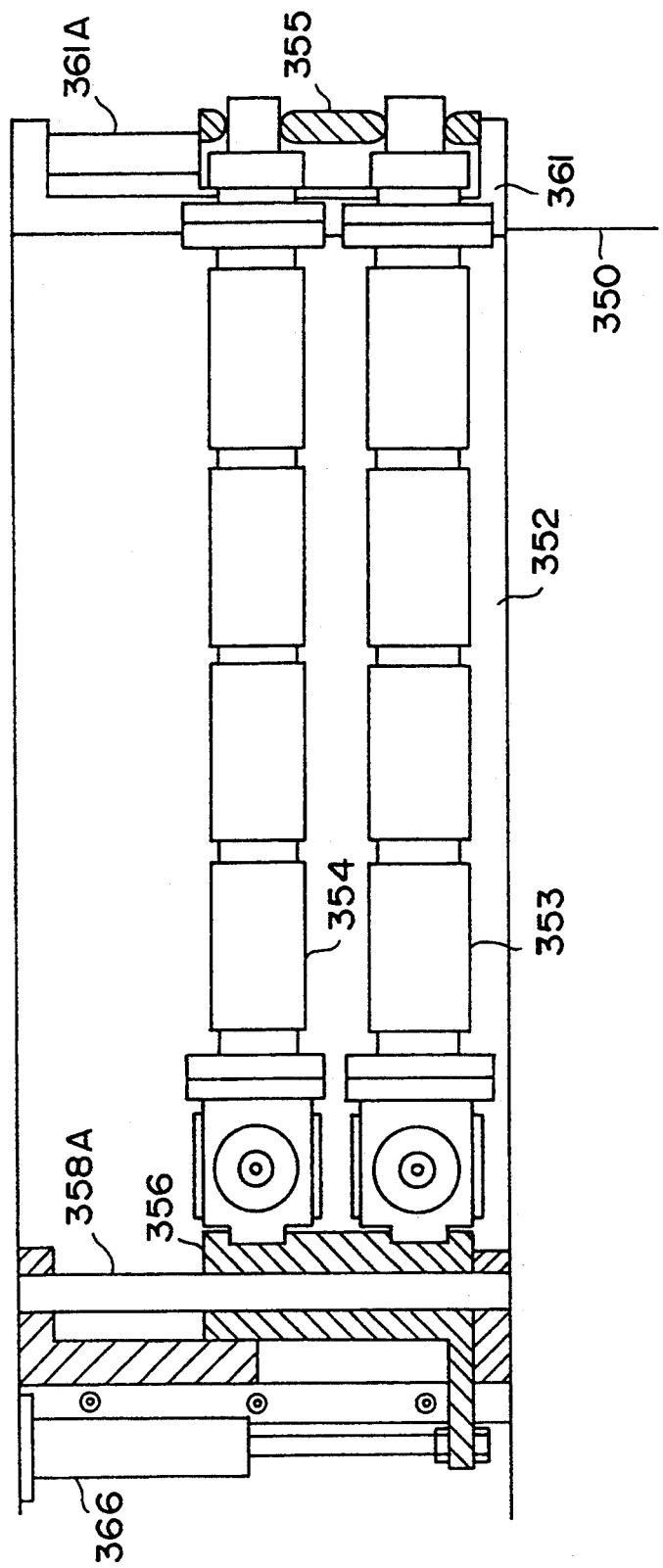
FIG. 31 is a plan view of the modified hot runner exchange apparatus shown in FIG. 30.
Figure 32:
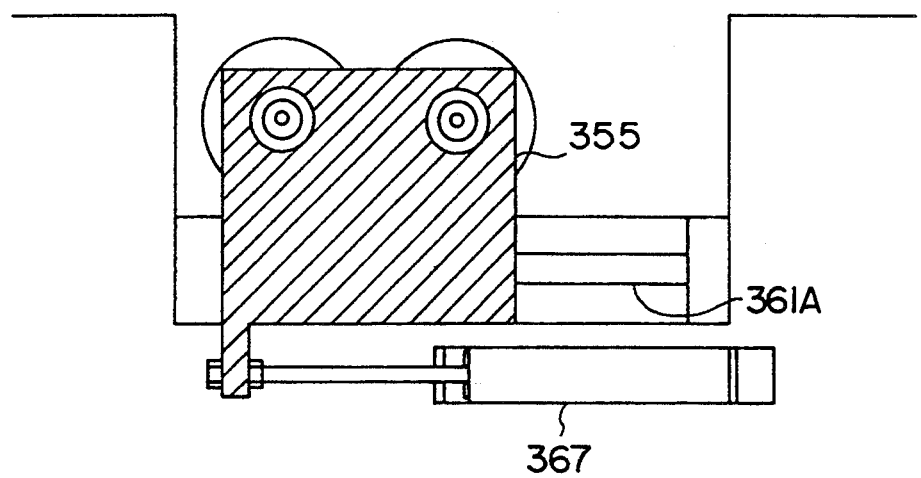
FIG. 32 is a right side end view, partly in section, of the hot runner exchange apparatus shown in FIG. 30.
Figure 33:
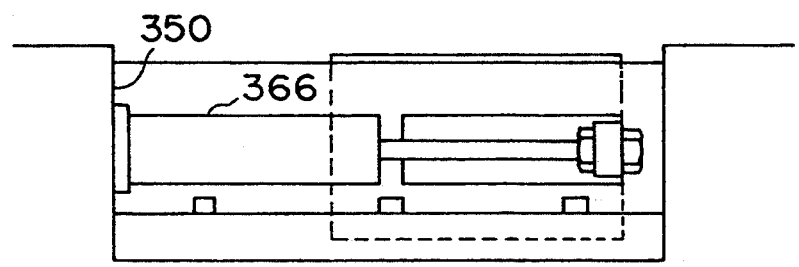
FIG. 33 is a left side end view of the hot runner exchange apparatus shown in FIG. 31.

A case wherein the fourth hot runner 354 now being used is substituted by a third hot runner 353 to be used next will be described with reference to FIGS. 30–32. More particularly, the piston rod 359A of the nozzle urging cylinder 359 is retracted and the nozzle 364 of the hot runner is lowered below the stationary metal mold mounting surface 351. Then cylinders 367 and 366 are operated synchronously for simultaneously slide left and right supporting blocks 355 and 356 to exchange the third hot runner 353 and the fourth hot runner 354. In this manner, the hot runners can be instantly exchanged.

This embodiment has the same advantages as the before described embodiment.

What is claimed is:

1. Hot runner exchange apparatus utilized in a vertical injection molding machine comprising a metal mold opened and closed in a vertical direction, a mold clamping device, an injection device having a cylinder, a nozzle at a front end of said heating cylinder, said nozzle being directed in a horizontal direction, and a hot runner acting as a passage for supplying molten resin to said mold clamping device from said injection device, said hot runner exchange apparatus comprising:

hanging means for hanging said hot runner;
means for moving said hanging means in a vertical direction;
means for moving said hanging means in a horizontal direction;
a frame member for supporting said hanging means, said vertical moving means and said horizontal moving means;
means for moving said frame member in taking in and taking out directions of said hot runner; and
means, disposed in said frame member, for moving said frame member in a direction perpendicular to said taking in and taking out directions.

2. The hot runner exchange apparatus according to claim 1 wherein said means for hanging said hot runner comprises an electromagnet.

3. The hot runner exchange apparatus according to claim 1 wherein said hanging means comprises a hanging bar pivotally coupled to a cylinder via a coupling member at a first end thereof and connected to a hanging member at a second end thereof.

4. The hot runner exchange apparatus according to claim 1 wherein said means for moving said hung hot runner in a vertical direction comprises a cylinder having a piston rod moved in a vertical direction.

5. The hot runner exchange apparatus according to claim 1 wherein said means for moving said hung hot runner in a horizontal direction comprises a swinging arm swung about a guide rod of the mold clamping device, and means for driving said swinging arm.

6. Hot runner exchange apparatus according to claim 1 wherein an openable and closable opening is provided for said hot runner on a side of said injection device such that said hot runner can be moved in a horizontal direction.

7. The hot runner exchange apparatus according to claim 1 wherein said means for moving said hot runner in the vertical direction includes a positioning cylinder for holding one end of said hot runner and for determining the position of the hot runner, and an urging cylinder for holding the other end of said hot runner to urge an injection nozzle of said hot runner against a metal mold.

8. Hot runner exchange apparatus utilized in a vertical injection molding machine comprising a metal mold opened and closed in a vertical direction, a mold clamping device, an injection device having a heating cylinder, a nozzle at a front end of said heating cylinder, said nozzle being directed in a horizontal direction, and a hot runner acting as a passage for supplying molten resin to said mold clamping device from said injection device, said hot runner exchange apparatus comprising:
supporting means for supporting a plurality of hot runners in a juxtaposed state, in a groove formed in a stationary die plate;
a shaft about which said supporting means is rotated;
driving means for rotating said shaft; and
means for reciprocating said hot runners for causing one of said hot runners to contact said metal mold.

9. Hot runner exchange apparatus utilized in a vertical injection molding machine comprising a metal mold opened and closed in a vertical direction, a mold clamping device, an injection device having a heating cylinder, a nozzle at a front end of said heating cylinder, said nozzle being directed in a horizontal direction, and a hot runner acting as a passage for supplying molten resin to said mold clamping device from said injection device, said hot runner exchange apparatus comprising:
supporting means for supporting a plurality of hot runners in a juxtaposed state in a groove formed in a stationary die plate;
driving means for reciprocating said supporting means in a perpendicular direction to an axis of said hot runner; and
means for reciprocating said hot runners for causing one of said hot runners to contact said metal mold.

10. Hot runner exchange apparatus utilized in a vertical injection molding machine comprising a metal mold opened and closed in a vertical direction, a mold clamping device, an injection device having a heating cylinder, a nozzle at a front end of said heating cylinder, said nozzle being directed in a horizontal direction, and a hot runner acting as a passage for supplying molten resin to said mold clamping device from said injection device, said hot runner exchange apparatus comprising:
hanging means for hanging said hot runner;
means for moving said hanging means in a vertical direction comprising a cylinder having a piston rod movable in a vertical direction; and
means for moving said hanging means in a horizontal direction.

11. Hot runner exchange apparatus utilized in a vertical injection molding machine comprising a metal mold opened and closed in a vertical direction, a mold clamping device, an injection device having a heating cylinder, a nozzle at a front end of said heating cylinder, said nozzle being directed in a horizontal direction, and a hot runner acting as a passage for supplying molten resin to said mold clamping device from said injection device, said hot runner exchange apparatus comprising:
hanging means for hanging said hot runner;
means for moving said hanging means in a vertical direction including a positioning cylinder for holding and fixing the position of one end of said hot runner, and an urging cylinder for holding the other end of said hot runner to urge an injection nozzle of said hot runner against said metal mold; and
means for moving said hanging means in a horizontal direction.

* * * * *